US007643549B2

(12) United States Patent  
Chen

(10) Patent No.: US 7,643,549 B2
(45) Date of Patent: Jan. 5, 2010

(54) WIRELESS DEVICE HAVING A HARDWARE ACCELERATOR TO SUPPORT EQUALIZATION PROCESSING

(75) Inventor: Yue Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 722 days.

(21) Appl. No.: 10/951,989

(22) Filed: Sep. 28, 2004

(65) Prior Publication Data

US 2006/0067394 A1    Mar. 30, 2006

(51) Int. Cl.
*H03H 7/30*      (2006.01)

(52) U.S. Cl. .................. 375/229; 711/210; 711/220; 712/34; 375/341

(58) Field of Classification Search .............. 375/229, 375/232, 233, 234, 343, 260; 455/3.01, 403, 455/408, 422.1, 436, 439, 456.1, 456.6, 67.11; 711/220, 201; 370/206; 712/34

See application file for complete search history.

(56) References Cited

U.S. PATENT DOCUMENTS

| | | | | |
|---|---|---|---|---|
| 6,400,928 B1* | 6/2002 | Khullar et al. | ............ | 455/67.11 |
| 2003/0053535 A1* | 3/2003 | Malkov et al. | .............. | 375/233 |
| 2004/0143722 A1* | 7/2004 | Becker | ....................... | 711/220 |
| 2004/0252798 A1* | 12/2004 | Chang et al. | ................. | 375/350 |
| 2005/0013239 A1* | 1/2005 | Agrawal et al. | ............. | 370/206 |
| 2005/0281358 A1* | 12/2005 | Bottomley et al. | .......... | 375/343 |
| 2007/0183514 A1* | 8/2007 | Iancu et al. | ................. | 375/260 |

\* cited by examiner

*Primary Examiner*—Sudhanshu C Pathak
(74) *Attorney, Agent, or Firm*—Garlick Harrison & Markison

(57) ABSTRACT

The present invention provides an equalizer processing module within a wireless terminal having an equalizer interface that receives an incoming baseband signal from a baseband processor operably coupled to the equalizer processing module and outputs soft decisions. A processor or advanced reduced instruction set computer (RISC) machine (ARM) couples to the equalizer interface while an equalizer accelerator module operably couples to the processor or ARM. Processing of the incoming baseband signal to produce soft decisions is performed by the combination of the processor and equalizer accelerator module. A sample capture buffer and an equalizer output buffer which may or may not be within the equalizer processing module allow data to be sampled and serves as the input and output for the equalizer processing module. This equalizer accelerator may specifically perform compute intensive operations such as Trellis computations for MAP equalization or MLSE equalization.

13 Claims, 21 Drawing Sheets

| Parameter | Word Sizes |
|---|---|
| Mode bit indicates burst length N, N = 62 EDGE | 2 bit x 1 |
| Received data<br><br>LH input data, $r_n^I$, $r_n^Q$ n=1 to N<br><br>RH input data, $r_n^I$, $r_n^Q$ n=1 to N | 16 bits x 62 x 2<br><br>16 bits x 62 x 2 |
| Trellis initial states and masks:<br><br>  LHS initial state<br><br>    Initial/tentative decision feedback modulated symbols<br><br>  RHS initial state<br><br>    Initial/tentative decision feedback modulated symbols | 10 x 4-bit<br><br>10 x 4-bit |
| S-parameters $\{s_i^I, s_i^Q\}$, i = 0,1,...,5 | 9 bits x 12 |
| Soft output metric scale factor | 5 bits x 1 |

FIG. 12

Viterbi Demodulator Decoder Registers

| | | | | | |
|---|---|---|---|---|---|
| EQ_CFG | E400 | R/W | 0000 | Equalizer Configuration Register | 33 |
| EQSEL | E401 | R/W | 0000 | EQ Memory Selecting Register | 36 |
| EQAPR | E402 | R/W | 0000 | Viterbi I/O Buffer Pointer Address Register (Indirect Addressing) | 37 |
| EQBUF | E403 | R/W | 0000 | Viterbi Input/Output Buffer | 38 |
| VITRLL[12] | E481-E48D | R/W | 0000 | Viterbi Trellis Metric Buffer (E481-6: I; E488-D: Q). (EDGE only) | 40 |
| LHINIT | E490 | R/W | 0000 | Viterbi LH INIT State and Mask Trellis Buffer | 34 |
| RHINIT | E491 | R/W | 0000 | Viterbi RH INIT State and Mask Trellis Buffer | 35 |
| LHFIN | E492 | R/W | 0000 | Viterbi LH FINAL State and Mask Trellis Buffer. . (32 state GMSK only) | 34 |
| RHFIN | E494 | R/W | 0000 | Viterbi RH FINAL State and Mask Trellis Buffer. . (32 state GMSK only) | 35 |
| LHFB | E492 | R/W | 0000 | Equalizer Initial Feedback Symbols: Left side. (EDGE only) | 34 |
| RHFB | E494 | R/W | 0000 | Equalizer Initial Feedback Symbols: Right side. (EDGE only) | 35 |
| VITNSF | E497 | W | 0000 | Viterbi Noise Scale Factor Buffer | 35 |

FIG. 19

| Parameter | Word Sizes |
|---|---|
| Mode bit indicates burst length N, N = 63 (TCH), N=44 (SCH) | 2 bit x 1 |
| Received data<br><br>LH input data, $z_k$, k=1 to N<br><br>RH input data, $z_k$, k=1 to N | 15 bits x 63<br><br><br>15 bits x 63 |
| Trellis initial and terminal states and masks:<br><br>LHS initial state and mask<br><br>LHS final and mask<br><br>RHS initial state and mask<br><br>RHS final and mask | <br><br>16 bits x 1<br><br>16 bits x 1<br><br>16 bits x 1<br><br>16 bits x 1 |
| Branch metrics, $M_k$ k = 0,...,63 | 15 bits x 64 |
| Soft output metric scale factor | 5 bits x 1 |

FIG. 20

WIRELESS DEVICE HAVING A HARDWARE ACCELERATOR TO SUPPORT EQUALIZATION PROCESSING

BACKGROUND

1. Technical Field

The present invention relates generally to cellular wireless communication systems; and more particularly to a distinct application specific integrated circuit (ASIC) to support equalization processing within a wireless terminal in a cellular wireless communication system.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC). GPRS and EDGE include multiple coding/puncturing schemes and multiple modulation formats, e.g., GMSK and 8PSK. Particular coding/puncturing schemes and modulation formats used at any time depend upon the quality of a servicing forward link channel, e.g., Signal-to-Noise-Ratio of the channel, Bit Error Rate of the channel, Block Error Rate of the channel, etc.

The GSM standard specifies communications in a time divided format (in multiple channels). The GSM standard specifies a 20 ms frame that is divided into four sub-frames, each including eight slots of approximately 625 µs in duration. Each slot corresponds to a Radio Frequency (RF) burst having a left side, a midamble, and a right side. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

As software is becoming increasingly more powerful with improved microelectronic technologies providing new programmable processors, additional functionalities may be added. These include the application of multimedia content or visual information in a mobile connection. Already today wireless terminals are not limited to only voice communications. Other types of data including real time or streaming multimedia may be provided. However, to provide these new functionalities and achieve low data rates often requires compute intensive operations by the processors. These functionalities place ever-growing demands on the processor within the wireless environment.

Unlike a desktop computer coupled to a network via a landline connection a mobile wireless terminal will have a limited data rate between itself and the servicing base station. Additionally, the processors within the wireless terminal are assigned multiple processing duties. The increased processing associated with these functionalities for various client services and devices requires access to additional processing power in order to maintain real time or streaming audio/visual communications. The addition of processing requirements within the wireless terminal requires new methods of accessing and utilizing this processing power to balance the processing requirements of the system processor while maintaining real time audio/visual communications.

BRIEF SUMMARY OF THE INVENTION

In order to overcome the shortcomings of prior devices, the present invention provides an equalizer processing module within a wireless terminal that substantially addresses the above-identified needs as well as others. This equalizer processing module has an equalizer interface that receives an incoming baseband signal from a baseband processor operably coupled to the equalizer processing module and outputs soft decisions. A processor, such as an advanced reduced instruction set computer (RISC) machine (ARM) couples to the equalizer interface. Additionally, an equalizer accelerator module operably couples to the processor or ARM. Processing of the incoming baseband signal to produce soft decisions is performed by the combination of the processor and equalizer accelerator module. The equalizer interface may further include a sample capture buffer and an equalizer output buffer which may or may not be within the equalizer processing module. This allows data to be sampled and serves as the input and output for the equalizer processing module. These buffers may be part of the equalizer interface or may be coupled to the equalizer interface and part of the system within the wireless terminal operably coupled to the equalizer interface. This equalizer processing module may support either GSM or edge operations and the accelerator may specifically perform compute intensive operations such as Trellis computations for MAP equalization or MLSE equalization.

Yet another embodiment provides a terminal that has a radio frequency (RF) front end and a baseband processor communicatively coupled to the RF front end. An equalizing processing module, operably coupled to the baseband processor, receives the baseband signal to produce soft decisions. This equalizer processing module further includes an equalizer interface that receives an incoming baseband signal from a baseband processor operably coupled to the equalizing processing module and outputs soft decisions. A processor or ARM couples to the equalizer interface. Additionally, an equalizer accelerator module operably couples to the processor or ARM when processing the incoming baseband signal to produce soft decisions. The combination of the processor and equalizer accelerator module performs this processing. The equalizer interface may further include a sample capture buffer and an equalizer output buffer which may or may not be within the equalizer processing module to allow data to be sampled and returned. This serves as the input and output for the equalizer processing module and may be part of the equalizer interface or may be coupled to the equalizer interface and part of the system processors within the wireless terminal. This equalizer processing module may support either GSM or edge operations and the accelerator may specifically perform compute intensive operations such as trellis computations for MAP equalization or MLSE equalization.

Yet another embodiment provides a method to process the baseband signals to produce soft decisions within a wireless terminal. This process involves providing a baseband signal to an equalizer processing module. This may be done, for example, through a sample capture buffer. A processor, within the equalizing processing module, performs the processing of the baseband signals to produce the soft decisions. The equalizer accelerator module may be configured based upon the modulation format associated with the baseband signal. The processing of the baseband signal is then divided between the processor and the equalizer accelerator module. Once processing is complete, the soft decisions are provided to a baseband or a system processor via an output buffer.

Other features and advantages of the present invention will become apparent from the following detailed description of the invention made with reference to the accompanying drawings.

BRIEF DESCRIPTION OF THE DRAWINGS

FIG. 12 is a table that describes parameters associated with processing a received EDGE data burst;

FIG. 19 is a table that provides an example of an EDGE/GSM Equalizer Register Summary and Memory Map; and FIG. 20 is a table that describes parameters associated with processing a received GSM data burst.

DETAILED DESCRIPTION OF THE DRAWINGS

Figure 1:
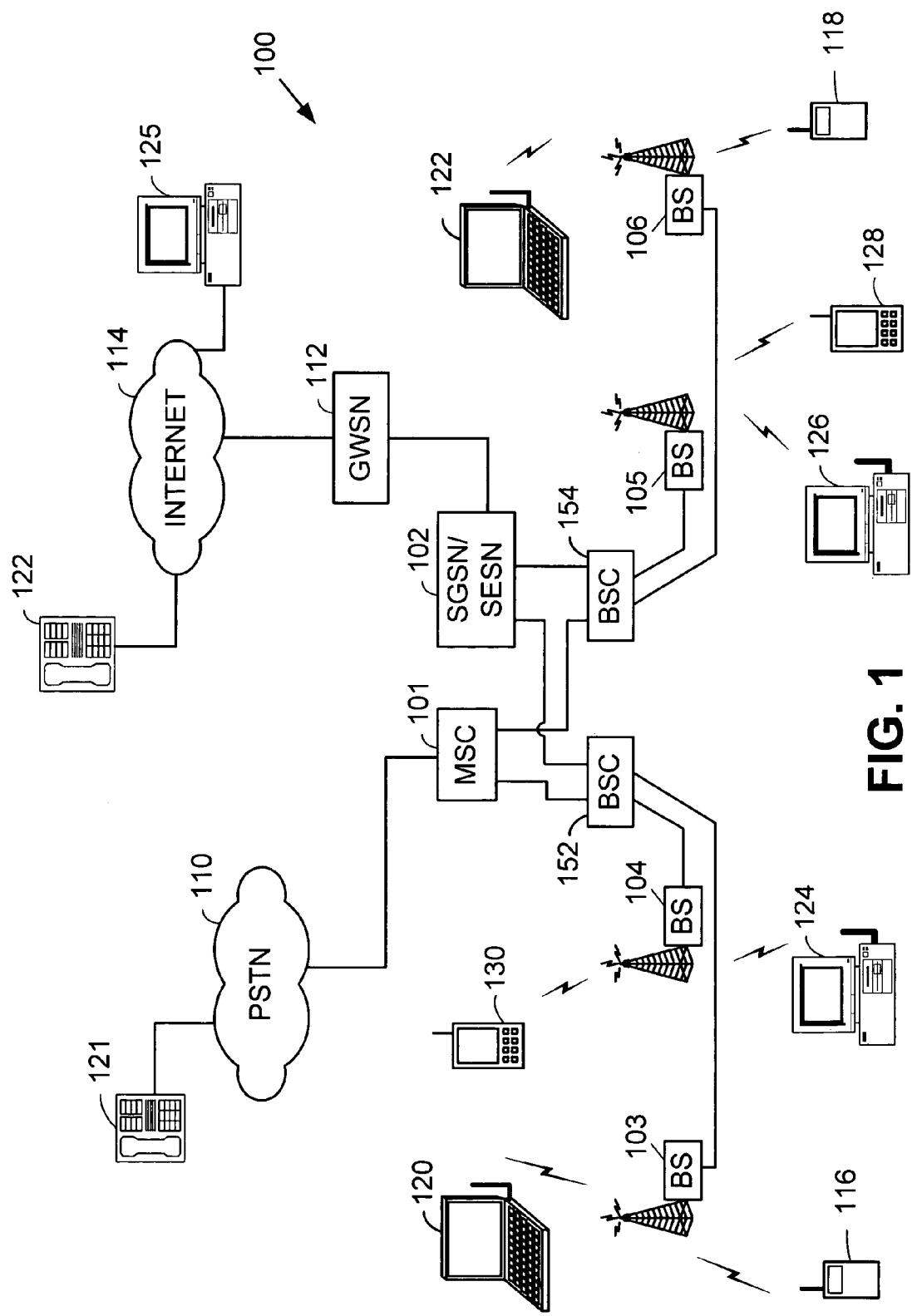
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to how the wireless terminal determines its uplink schedule while reducing power consumption.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

In particular, the wireless terminals 116-130 support the pipelined processing of received RF bursts in slots of a GSM frame so that a plurality of slots in each sub-frame of a GSM frame are allocated for forward link transmissions to a single wireless terminal. In one particular embodiment, a number of slots of a GSM frame are allocated for forward link transmissions to a wireless terminal such that the wireless terminal must receive and process a number of RF bursts, e.g., 2, 3, 4, or more RF bursts, in each sub-frame of the GSM frame. The wireless terminal is able to process the RF bursts contained in these slots and still service reverse link transmissions and the other processing requirements of the wireless terminal.

Figure 2:
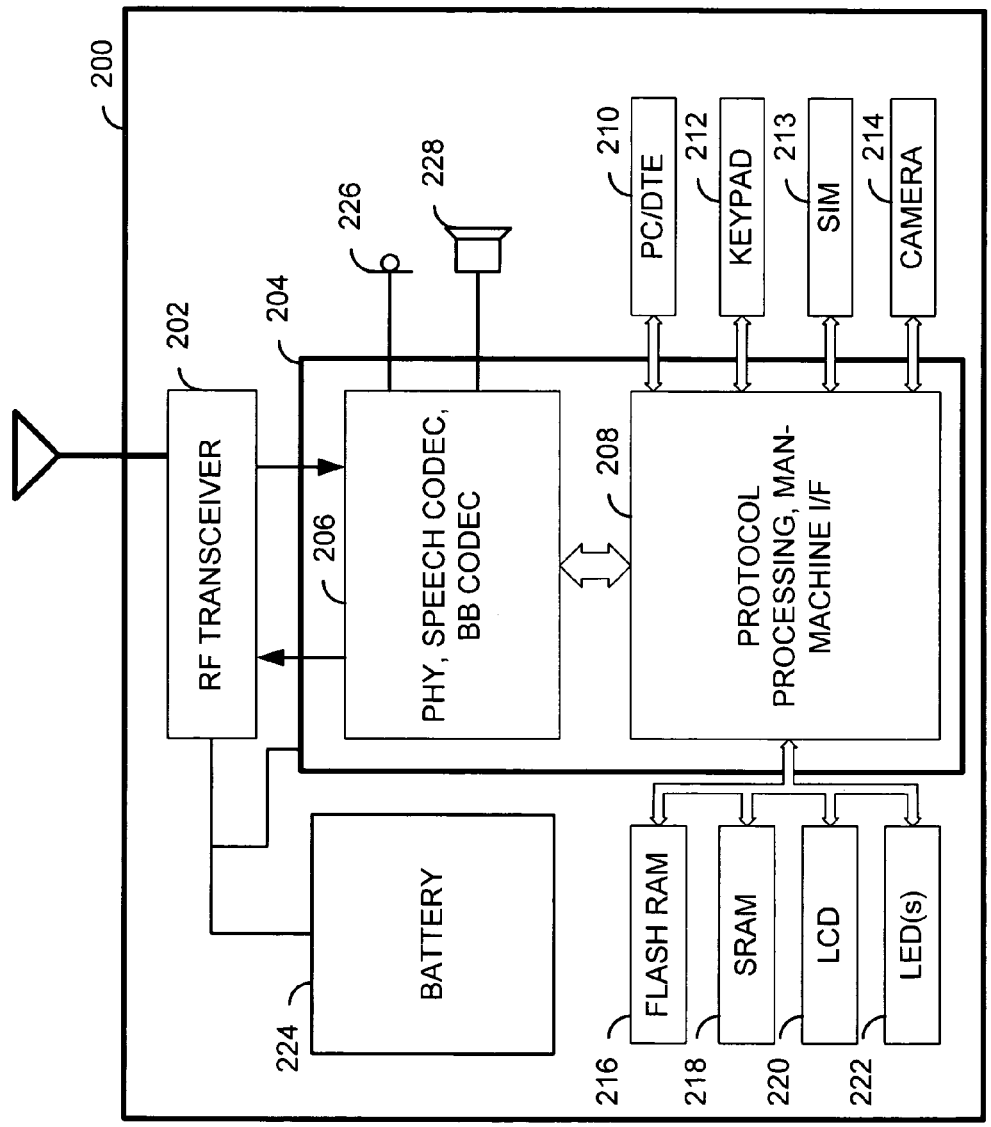
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
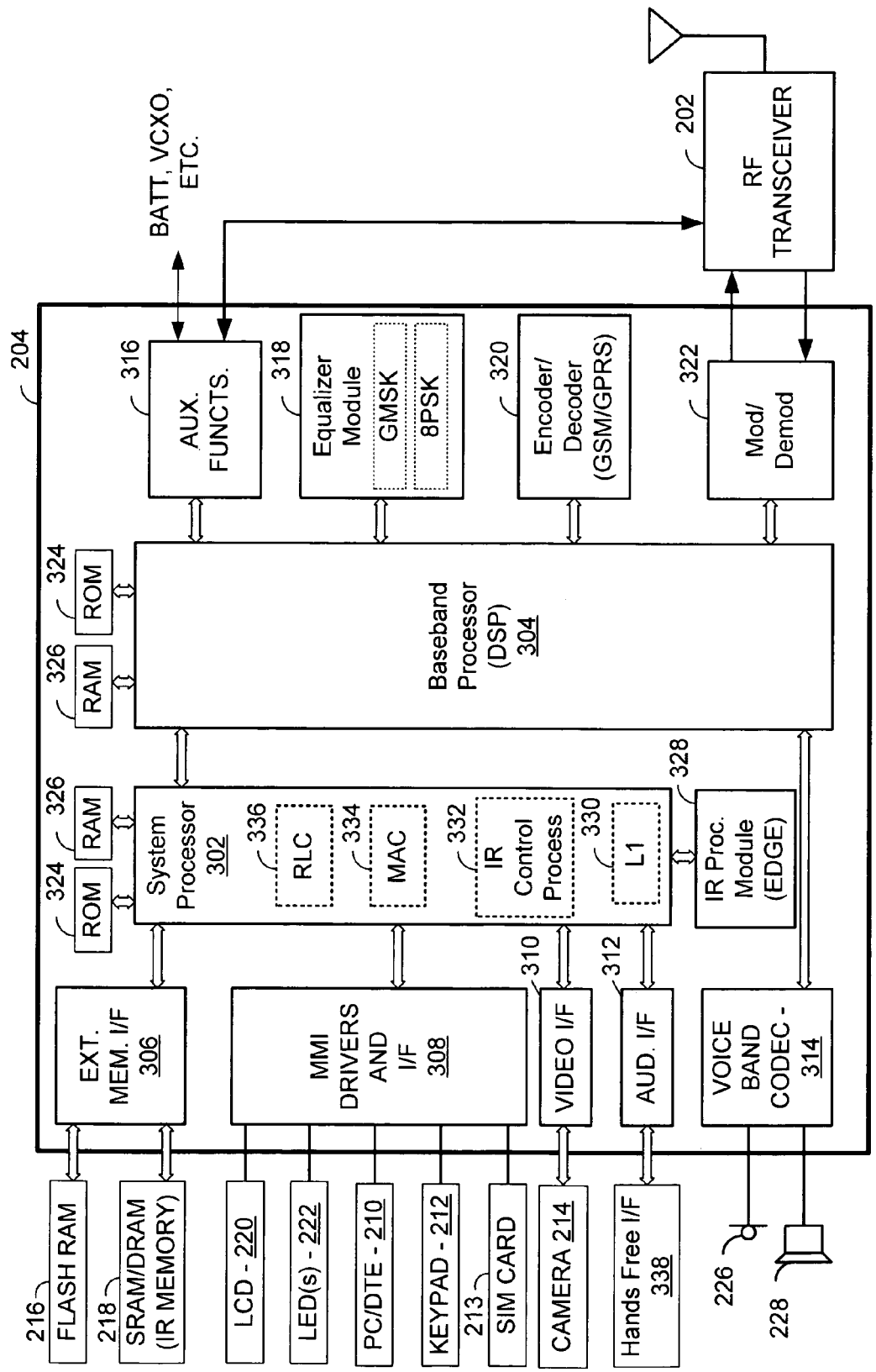
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and an Incremental Redundancy (IR) processing module 328. The operations and details of the equalizer module will be discussed in further detail. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further with reference to FIGS. 5-7B, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each sub-frame of a GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

Figure 4:
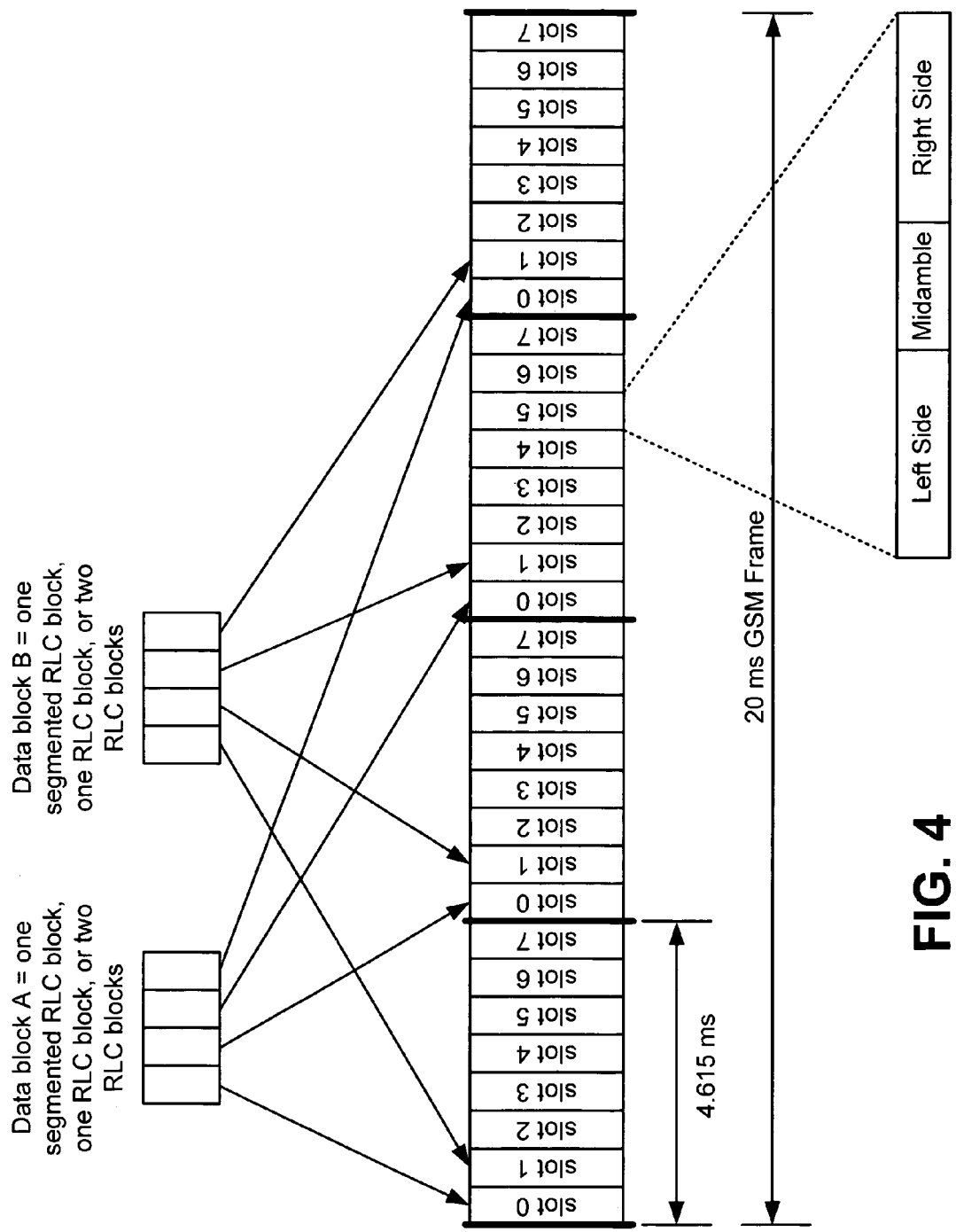
FIG. 4 is a block diagram illustrating the general structure of a GSM frame and the manner in which data blocks are carried by the GSM frame.

FIG. 4 is a block diagram illustrating the general structure of a GSM frame and the manner in which data blocks are carried by the GSM frame. The GSM frame is 20 ms in duration, including guard periods, is divided into four sub-frames, and includes eight slots, slots 0 through 7, in each sub-frame. Each slot is approximately 577 μs in duration, includes a left side, a midamble, and a right side. The left side and right side of an RF burst of the time slot carry data while the midamble is a training sequence.

The RF bursts of four time slots of the GSM frame carry a segmented RLC block, a complete RLC block, or two RLC blocks, depending upon a supported Modulation and Coding Scheme (MCS) mode or GPRS CS-n mode, e.g., CS-1, CS-2. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode or CS mode of each set of slots, i.e., slot n of each sub-frame, for the GSM frame is consistent for the GSM frame. Further, the MCS mode or CS mode of differing sets of slots of the GSM frame, e.g., slot 0 of each sub-frame vs. any of slots 1-7 of each sub-frame, may differ. As will be described further with reference to FIG. 5, the wireless terminal 200 may be assigned multiple slots for forward link transmissions that must be received and processed by the wireless terminal 200.

Figure 5:
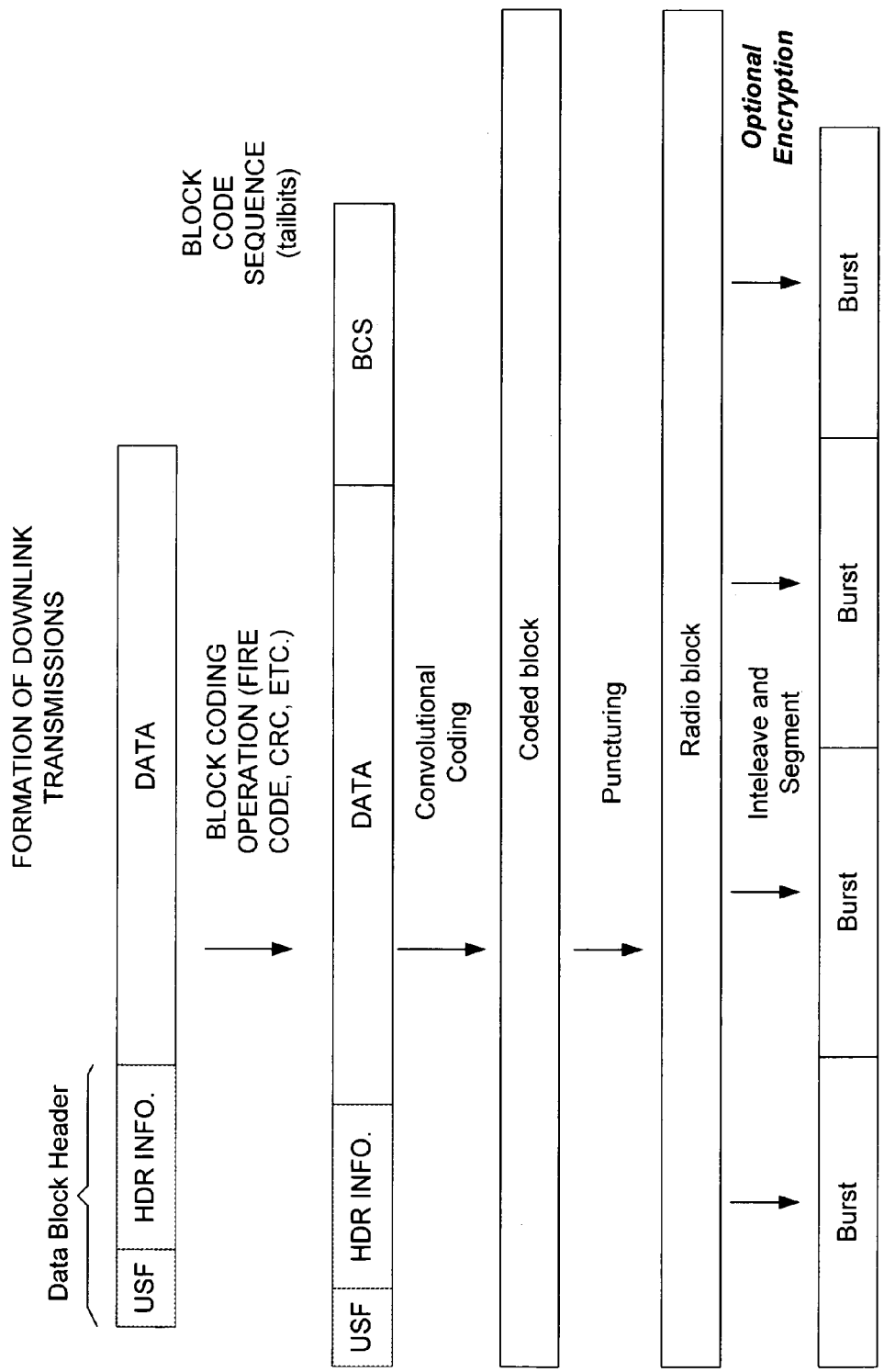
FIG. 5 is a block diagram illustrating the formation of down link transmissions.

FIG. 5 depicts the various stages associated with mapping data into RF bursts. A Data Block Header and Data are initially uncoded. The Data Block Header contains Uplink Status Flags (USF) bits and other header information. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the Data. In CS-1, the header and data are coded together using block coding and convolutional coding. In non-CS-1 coding schemes, the USF bits may be placed at specific known positions, depending on the coding scheme. Additionally, in these non-CS-1 coding schemes, the header and data is often coded separately With GPRS operation, the Fire Codes allow for either error correction or error detection. In one embodiment, the Fire Code is a shortened binary cyclic code that appends 40 redundancy bits to 184 bits of the data Header and Data. The pure error detection capability of Fire Coding is sufficient to let undetected errors go through with only a probability of $2^{-40}$. After block coding has supplemented the Data with redundancy bits for error detection, calculation of additional redundancy for error correction to correct the transmissions caused by the radio channels. The internal error correction or coding scheme of GSM is based on convolutional codes.

Some redundant bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Figure 6:
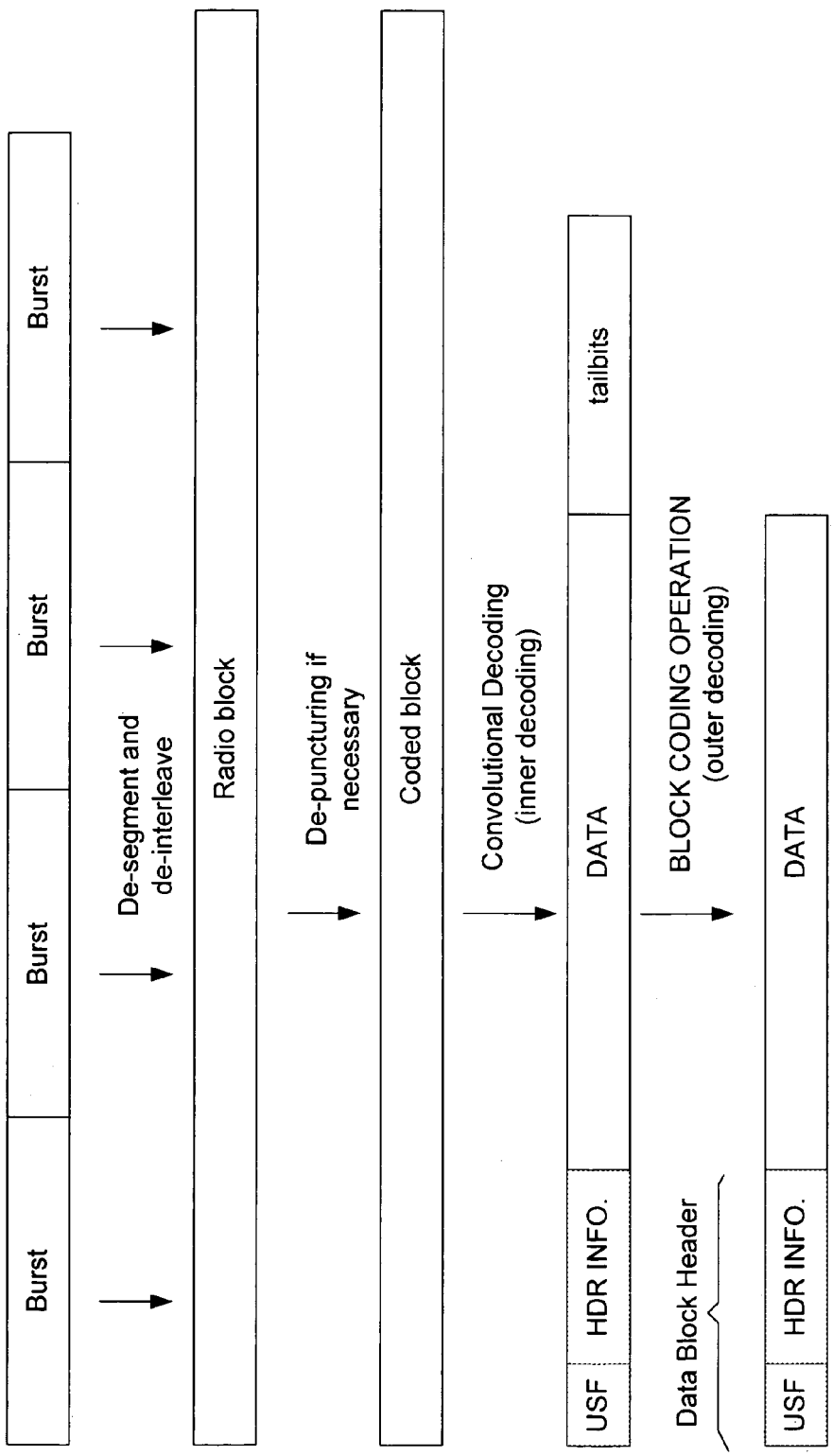
FIG. 6 is a block diagram illustrating the stages associated with recovering a data block from a series of RF bursts.

FIG. 6 is a block diagram depicting the various stages associated with recovering a data block from an RF burst. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. The decoded data block includes the data block header and the data.

Figure 7A:
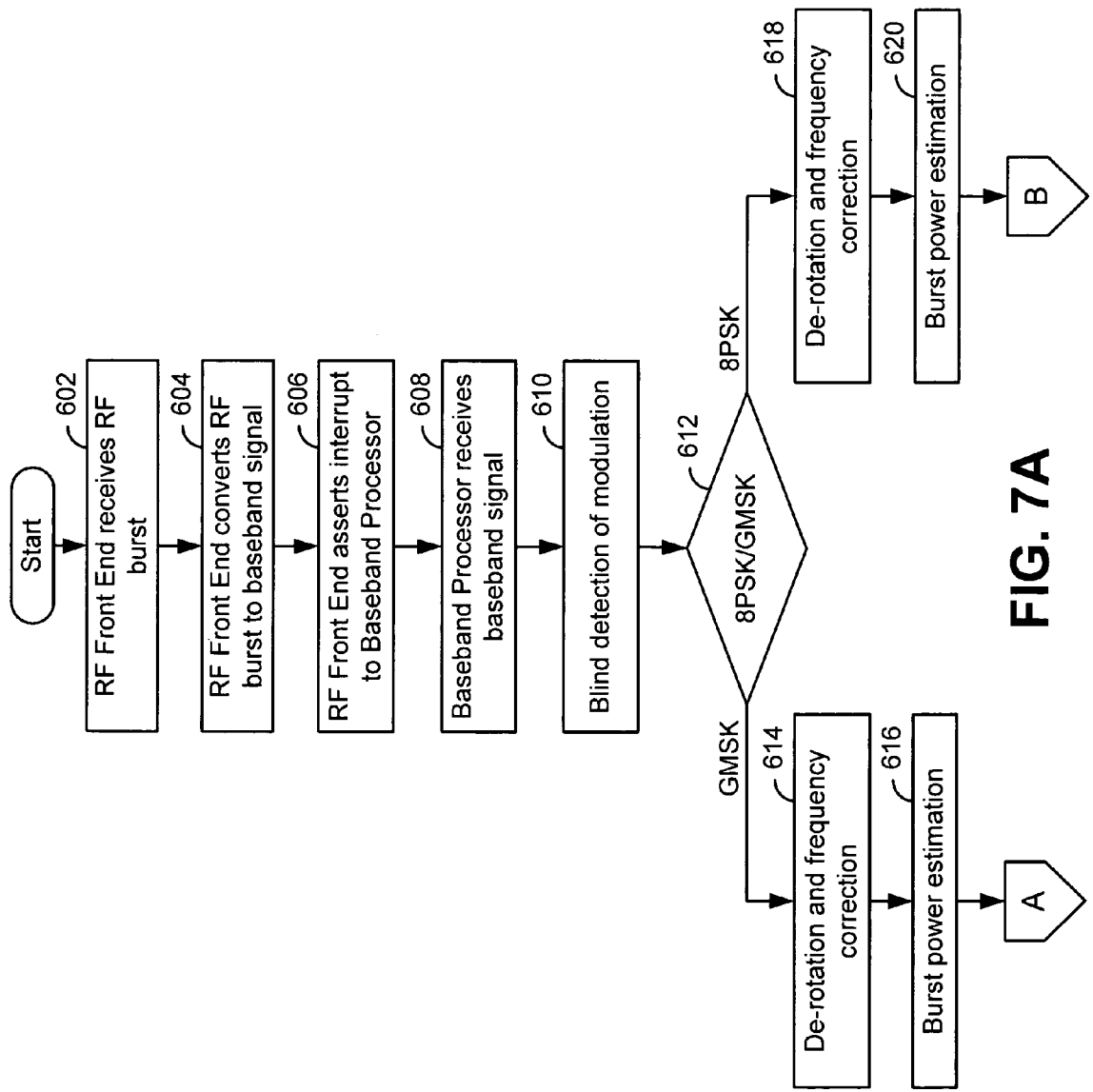
FIGS. 7A and 7B are flow charts illustrating operation of a wireless terminal in receiving and processing a RF burst.
Figure 7B:
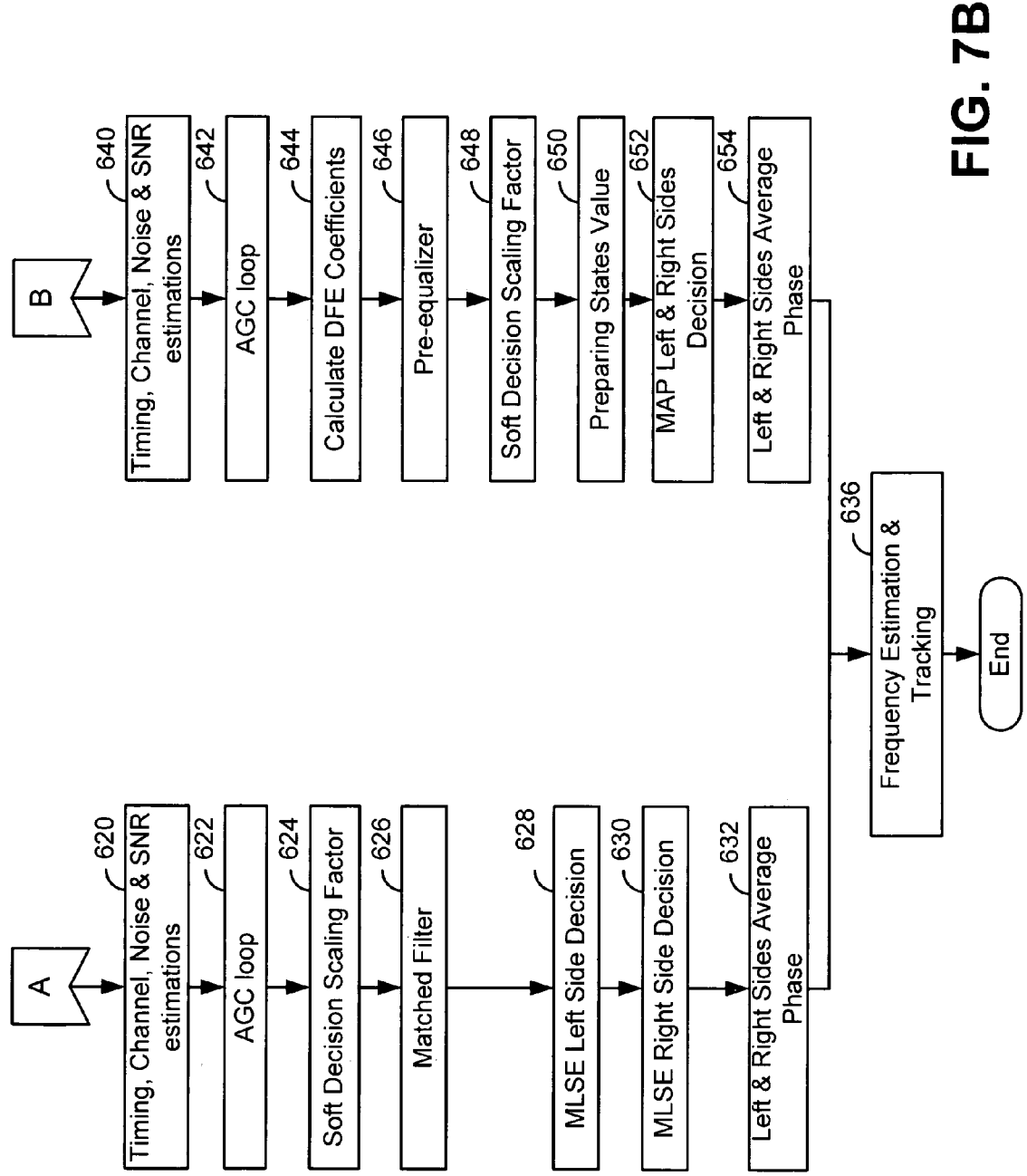

FIGS. 7A and 7B are flow charts illustrating operation of a wireless terminal 200 in receiving and processing a RF burst. The operations illustrated in FIG. 7A to 7B correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

Referring particular to FIG. 7A, operation commences with the RF front end 202 receiving an RF burst in a corresponding slot of a GSM frame (step 602). The RF front end 202 then converts the RF burst to a baseband signal (step 604). Upon completion of the conversion, the RF front end 202 sends an interrupt to the baseband processor 304 (step 606). Thus, as referred to in FIG. 7A, the RF front end 202 performs steps 602-606.

Operation continues with the baseband processor 304 receiving the baseband signal (step 608). In a typical operation, either the RF front end 202, the baseband processor 304, or modulator/demodulator 322 will sample the analog baseband signal to digitize the baseband signal. After receipt of the baseband signal (in a digitized format), the baseband processor 304 performs blind detection of a modulation format of the baseband signal (step 610). This blind detection of the modulation format determines the modulation format of the corresponding baseband signal. In one particular embodiment according to the GSM standard, the modulation format will be either Gaussian Minimum Shift Keying (GMSK) modulation or Eight Phase Shift Keying (8PSK) modulation. The baseband processor 304 makes the determination (step 612) and proceeds along one of two branches based upon the detected modulation format.

For GMSK modulation, the baseband processor 304 performs de-rotation and frequency correction of the baseband signal (step 614). Next, the baseband processor 304 performs burst power estimation of the baseband signal (step 616). Referring now to FIG. 7B via off page connector A, the baseband processor 304 next performs timing, channel, noise, and signal-to-noise ratio (SNR) estimation (step 620). Subsequently, the baseband processor 304 performs automatic gain control (AGC) loop calculations (step 622). Next, the baseband processor 304 performs soft decision scaling factor determination on the baseband signal (step 624). After step 624, the baseband processor 304 performs matched filtering operations on the baseband signal (step 626).

Steps 608-626 are referred to hereinafter as pre-equalization processing operations. With the baseband processor 304 performing these pre-equalization processing operations on the baseband signal it produces a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation. The equalizer module may support five equalizer algorithms: 64 state EDGE 8PSK MAP (Mobile Application Part), 16 state GMSK TCH MLSE (GMSK Traffic CHannel Maximum Likelihood Sequence Estimate), 16 state GMSK SCH MLSE (GMSK Synchronization CHannel Maximum Likelihood Sequence Estimate, 32 state GMSK TCH MLSE, and 32 state GMSK TCH MLSE. These algorithm types are coded into three mode bits (bits [2:0]) in the EQ_CFG Register. The input and output metrics and parameters associated with each of the equalizer algorithm types are listed in Table 1.

TABLE 1

| Algorithm | Inputs | Outputs |
|---|---|---|
| 64 State EDGE 8PSK MAP | 62 complex LH input received data symbols<br>62 complex RH input received data symbols<br>5 LH initial feed back symbols and 2 zero feed back symbol zero indicators<br>5 RH initial feed back symbols<br>6 complex S-parameters<br>1 Soft output metric scaling factor | 348 scaled soft metrics |
| 16 State GMSK TCH (SCH) MLSE | 62 (43) real LH input received data symbols<br>62 (43) real RH input received data symbols<br>1 each of LH initial state, LH initial mask, LH final state and LH final mask<br>1 each of RH initial state, RH initial mask, RH final state and RH final mask<br>16 precomputed branch metrics, "$M_k$'s"<br>1 Soft output metric scaling factor | 116 (78) scaled soft metrics |
| 32 State GMSK TCH (SCH) MLSE | 63 (44) real LH input received data symbols<br>63 (44) real RH input received data symbols<br>1 each of LH initial state, LH initial mask, LH final state and LH final mask<br>1 each of RH initial state, RH initial mask, RH final state and RH final mask<br>32 precomputed branch metrics, "$M_k$'s"<br>1 Soft output metric scaling factor | 116 (78) scaled soft metrics |

The equalizer is the final processing block of the data demodulation procedure. The equalizer demodulates the received data by first reading I and Q values from the sample-capture buffer. The complex samples are then rotated by frequency correction rotator. Correlation with the training sequence is performed to compute channel estimation metrics from the correlation values. This allows a synchronization offset to be computed from the training sequence correlation function, from which the energy metrics are produced. An auto-correlate of the channel estimation metrics produces compute state-dependent incremental metrics for Viterbi trellis for the GSM. After which, a match filter function is performed on the complex samples with channel estimation metrics for the GSM. The inputs identified in Table 1 are loaded with their associated algorithm. Equalization processing is initiated by writing to an input register. After processing the soft decision metrics are read from the equalizer output buffer. Table 2 provides a summary of an equalizer register and memory map.

TABLE 2

| Viterbi Demodulator Decoder Registers | |
|---|---|
| EQ_CFG | Equalizer Configuration Register |
| EQSEL | EQ Memory Selecting Register |
| EQAPR | Viterbi I/O Buffer Pointer Address Register (Indirect Addressing) |
| EQBUF | Viterbi Input/Output Buffer |
| VITRLL[12] | Viterbi Trellis Metric Buffer (E481-6: I; E488-D: Q). (EDGE only) |
| LHINIT | Viterbi LH INIT State and Mask Trellis Buffer |
| RHINIT | Viterbi RH INIT State and Mask Trellis Buffer |
| LHFIN | Viterbi LH FINAL State and Mask Trellis Buffer.. (32 state GMSK only) |
| RHFIN | Viterbi RH FINAL State and Mask Trellis Buffer.. (32 state GMSK only) |
| LHFB | Equalizer Initial Feedback Symbols: Left side. (EDGE only) |
| RHFB | Equalizer Initial Feedback Symbols: Right side. (EDGE only) |
| VITNSF | Viterbi Noise Scale Factor Buffer |

Equalizer Trellis Metric Registers include six buffers that hold state-dependent incremental metrics, S parameters. Table 3 describes registers within the Equalizer Trellis Metric Registers. These metrics are computed during the demodulation process. For the EDGE mode, S parameters are complex values, in which the real parts are stored in the first 6 registers and the image parts are stored separately. The functions of these registers will be discussed in further detail with respect to FIG. 8 and following.

TABLE 3

| Equalizer trellis Metric Registers |
|---|
| Equalizer S-Parameter Buffer |
| Equalizer Output Buffer (LHS Normal GSM Burst Format) |
| Equalizer Output Buffer (RHS Normal GSM Burst Format) |
| Equalizer Output Buffer, (LHS Normal EDGE Burst Format) |
| Equalizer Output Buffer, (RHS Normal EDGE Burst Format) |
| Equalizer Output Buffer (LHS SCH Burst Format) |
| Equalizer Output Buffer (RHS SCH Burst Format) |
| Trace Back Memory Buffer |
| Accumulated State Metric Memory |
| Partial ISI Trace Back Memory |

Generically, the equalizer module 318 receives the processed baseband signal, settings, and/or parameters from the baseband processor 304 and performs Maximum Likelihood Sequence Estimation (MLSE) equalization on the left side of the baseband signal (step 628). As was shown previously with reference to FIG. 4, each RF burst contains a left side of data, a midamble, and a right side of data. At step 628, the equalizer module 318 equalizes the left side of the RF burst to produce soft decisions for the left side. Then, the equalizer module 318 equalizes the right side of the processed baseband signal (step 630). The equalization of the right side produces a plurality of soft decisions corresponding to the right side.

The equalizer module 318 then issues an interrupt to the baseband processor 304 indicating that the equalizer operations are complete for the RF burst. The baseband processor 304 then receives the soft decisions from the equalizer module 318. Next, the baseband processor 304 determines an average phase of the left and right sides based upon the soft decisions received from the equalizer module 318 (step 632). The baseband processor 304 then performs frequency estimation and tracking based upon the soft decisions received from the equalizer module 318 (step 636). The operations of step 632 (or step 654) and step 636 are referred to herein as "post-equalization processing." After operation at step 636, processing of the particular RF burst is completed.

Referring again to FIG. 7A, the baseband processor 304 and equalizer module 318 take the right branch from step 612 when an 8PSK modulation is blindly detected at step 610. In the first operation for 8PSK modulation, the baseband processor 304 performs de-rotation and frequency correction on the baseband signal (step 618). The baseband processor 304 then performs burst power estimation of the baseband signal (step 620). Referring now to FIG. 7B via off page connector B, operation continues with the baseband processor 304 performing timing, channel, noise, and SNR estimations (step 640). The baseband processor 304 then performs AGC loop calculations on the baseband signal (step 642). Next, the baseband processor 304 calculates Decision Feedback Equalizer (DFE) coefficients that will be used by the equalizer module 318 (step 644). The baseband processor 304 then performs pre-equalizer operations on the baseband signal (step 646). Finally, the baseband processor 304 determines soft decision scaling factors for the baseband signal (step 648). Steps 618-648 performed by the baseband processor 304 are referred to herein as "pre-equalization processing" operations for an 8PSK modulation baseband signal. Upon completion of step 648, the baseband processor 304 issues a command to equalizer module 318 to equalize the processed baseband signal.

Upon receipt of the command from the baseband processor 304, the equalizer module 318 receives the processed baseband signal, settings, and/or parameters from the baseband processor 304 and commences equalization of the processed baseband signal. The equalizer module 318 first prepares state values that it will use in equalizing the 8PSK modulated processed baseband signal (step 650). In the illustrated embodiment the equalizer module 318 uses a Maximum A posteriori Probability (MAP) equalizer. The equalizer module 318 then equalizes the left and right sides of the processed baseband signal using the MAP equalizer to produce soft decisions for the processed baseband signal (step 652). Upon completion of step 654, the equalizer module 318 issues an interrupt to the baseband processor 304 indicating its completion of equalizing the processed baseband signal corresponding.

The baseband processor 304 then receives the soft decisions from the equalizer module 318. Next, the baseband processor 304 determines the average phase of the left and right sides of the processed baseband signal based upon the soft decisions (step 654). Finally, the baseband processor 304 performs frequency estimation and tracking for the soft decisions (step 636). The operations of steps 654 and 636 are referred to as post-equalization processing operations. From step 636, operation is complete for the particular RF burst depicts the various stages associated with recovering a data block from an RF Burst.

While the operations of FIGS. 7A and 7B are indicated to be performed by particular components of the wireless terminal, such segmentation of operations could be performed by differing components. For example, the equalization operations could be performed by the baseband processor 304 or system processor 302 in other embodiments. Further, decoding operations could also be performed by the baseband processor 304 or the system processor 302 in other embodiments.

Figure 8:
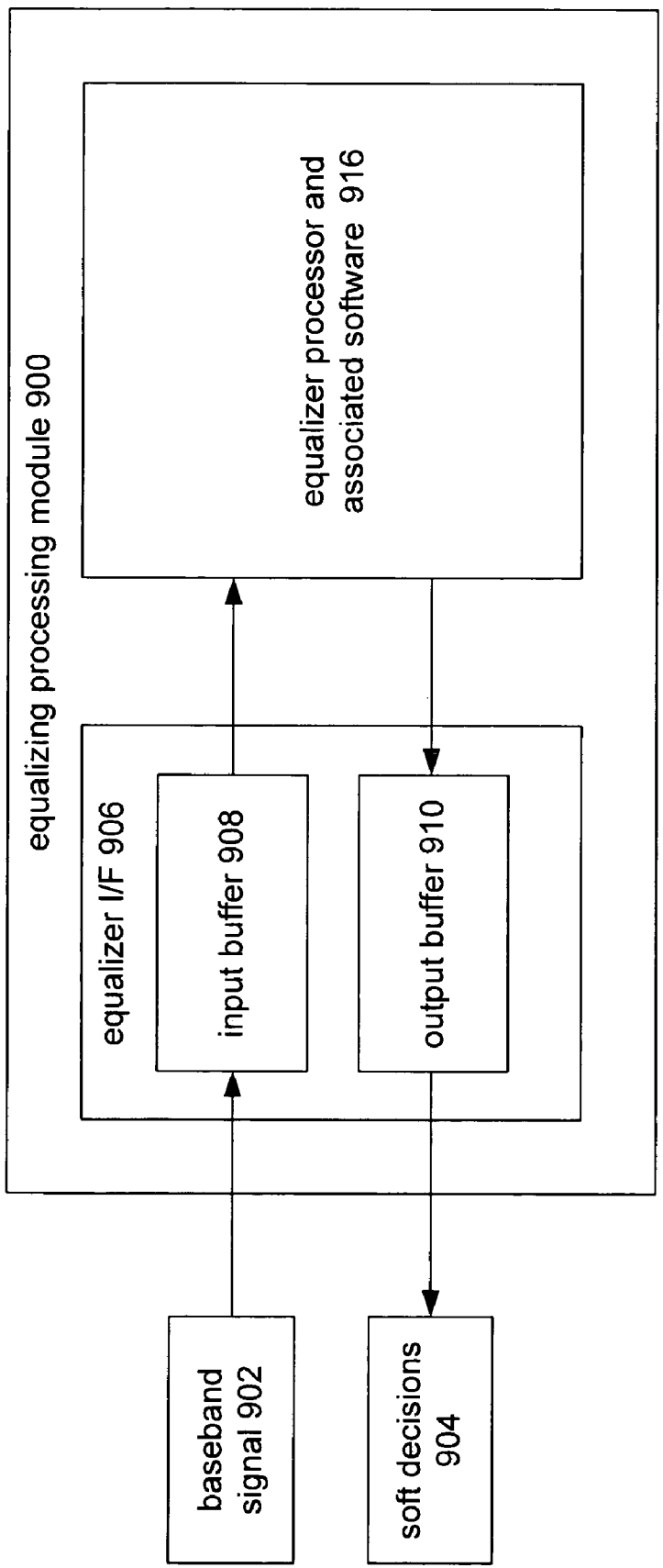
FIG. 8. is a block diagram illustrating an equalizing processing module implemented as an application specific integrated circuit (ASIC) of a wireless terminal constructed according to an embodiment of the present invention.
Figure 9:
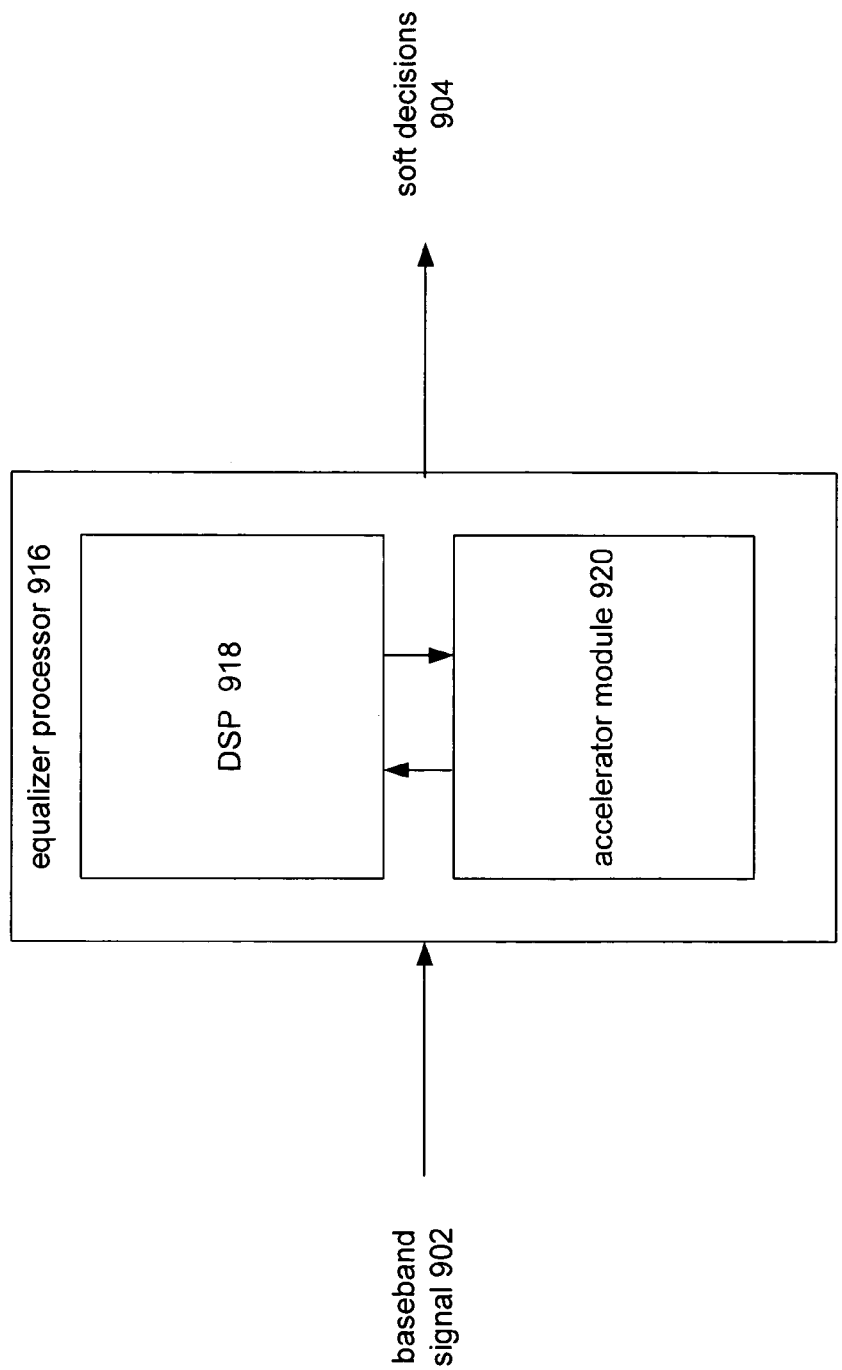
FIG. 9 is a block diagram illustrating equalizing processing operations of the equalizing processing module with particular emphasis on a division of processing duties within equalizer processor.

FIG. 8 is a block diagram illustrating an equalizing processing module 900 implemented as a hardware accelerator to support equalization processing within a wireless terminal constructed according to an embodiment of the present invention. In the embodiment of FIG. 9, equalizing processing module 900 services Trellis computations for MAP equalization of a GSM/EDGE downlink data burst, supports TCH Normal burst for both GSM and EDGE, processes of data preceding midamble, and data following midamble as two separate trellis computations, and produces soft-decision (4-bit) metric output scaled by estimated SNR and compatible with convolutional decoder formats. In the EDGE mode, the final state and mask registers are used as the additional initial feedback modulated symbol registers. In other embodiments the equalizing processing module 900 may serve as a GSM equalizer implemented in ASIC. Here the equalizing processing module 900 may perform Trellis computations for MLSE equalization of a GSM downlink data burst, support TCH Normal burst for both GSM, process data preceding midamble, and data following midamble as two separate trellis computations, and produce a soft-decision (4-bit) metric output scaled by estimated SNR and compatible with convolutional decoder formats.

FIG. 9 is a block diagram illustrating equalizing processing operations of the equalizing processing module 900 with particular emphasis on a division of processing duties within equalizer processor 916. Here, the equalization operations preformed on baseband signal 902 is split between DSP 918 and equalizer accelerator module 920 to produce soft decisions 904. The accelerator module may correspond to equalizer co-processor 318 of FIG. 3. Similarly, DSP 918 may correspond with DSP 304 or processor 302 of FIG. 3.

Figure 10:
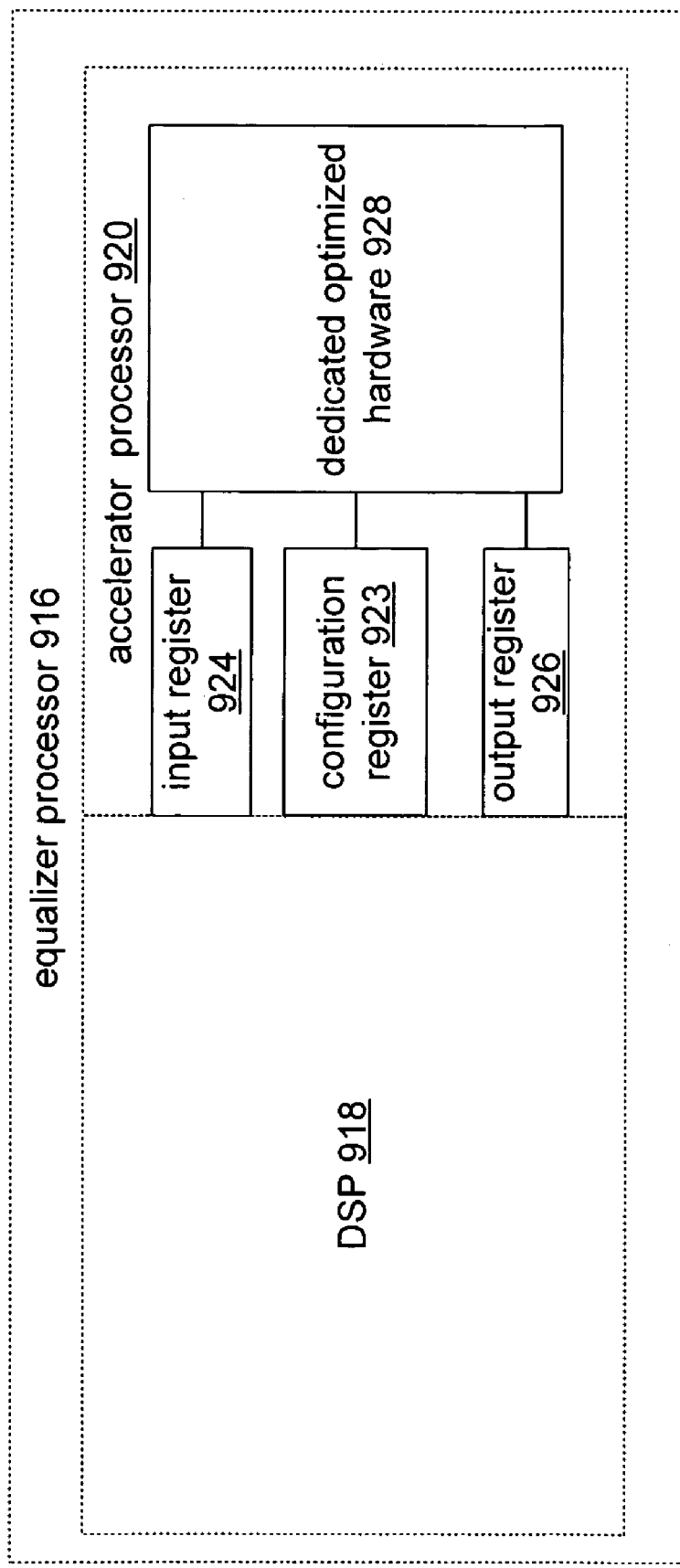
FIG. 10 is a block diagram illustrating the structure of equalizer co-processor that uses a dedicated hardware accelerator within a wireless terminal constructed according to an embodiment of the present invention.

FIG. 10 is a block diagram illustrating the structure of equalizer co-processor 318 that uses a dedicated hardware accelerator 920 within a wireless terminal constructed according to an embodiment of the present invention. Equalizer processor 916 includes both DSP 918 and accelerator 920. Equalizer processor 916 interfaces with other devices within the wireless terminal through an interface as shown in FIG. 8 having an input cache or sample buffer and output cache or buffer that operable couples to baseband processor 304. Alternatively a bus type interface may be used to couple the Equalizer co-processor to the baseband processor and CODEC. DSP 918 executes code to process the baseband signal. Optimized hardware blocks within accelerator 920 accelerate key compute intensive equalization algorithms. The input data is provided via registers 924 to the accelerator for processing. When the processing is complete, the resultant is placed in register 926 and retrieved by DSP 918. Thus, the key compute intensive video algorithms may be executed by dedicated optimized hardware 928. These key compute intensive algorithms and driver that perform these functions are transparent to the user of the hardware accelerator.

The accelerator module 920 may be used to perform compute intensive operations associated with a modified Bahl's maximum a posteriori probability (MAP) algorithm to realize soft-output equalization. This algorithm includes a forward equalization and a backward equalization. The forward part is the same as the regular Viterbi algorithm. However, only the accumulated distance metric for every state need be stored and further processing on soft decisions at this stage need not be performed. After finishing the forward equalization, the backward equalization commences and is similar to the forward equalization. The backward soft decisions combine with the forward soft decisions to form the final output soft decisions and hard decisions. The following briefly describes the modified Bahl's MAP algorithm.

Received signal: $r_k$, k=0, ..., K;

$$R_0^k = (r_0, \ldots, r_k) \text{ and } R = (r_0, \ldots, r_K); \quad \text{(eq. 1)}$$

8PSK signal: $d_k$, k=0, 1, ...;
S-parameters or estimated channels: $s_k$, k=0, 1, ..., L;

Channel state at time k: $x_k = (d_{k-L}, d_{k-L+1}, \ldots, d_{k-2}, d_{k-1})$; (eq. 2)

Joint soft metric of the state $x_k$:

$$J(x_k, R) = J_F(x_k, R_0^{k-1}) + J_B(R_k^K | x_k), \quad \text{(eq. 3)}$$

where $J_F(\cdot)$ is the forward accumulated metric at state $x_k$, $J_B(\cdot)$ is the backward accumulated metric at state $x_k$.

The forward and backward accumulated metric can be obtained by the following equations.

Forward (alpha):

$$J_F(x_k, R_0^{k-1}) = \min(J_F(x_{k-1}, R_0^{k-2}) + M(x_k, r_{k-1} | x_{k-1})); \quad \text{(eq. 4)}$$

Backward (beta):

$$J_B(R_k^K | x_k) = \min(J_B(R_{k+1}^K | x_{k+1}) + M(x_{k+1}, r_k | x_k)); \quad \text{(eq. 5)}$$

$$M(x_k, r_{k-1} | x_{k-1}) = |r_{k-1} - \sum_{i=0}^{L} s_i a_{k-1-i}^*|^2, \quad \text{(eq. 6)}$$

where '*' represents the conjugate and $\alpha_i$ is 8PSK modulated symbol.

After obtaining the joint soft metric $J(x_k,R)$, the corresponding hard-decisions are derived with an associated reliability. In order to reduce the complexity of the hardware implementation, a reduced state MAP algorithm may be employed based on the tentative decision.

Figure 11:
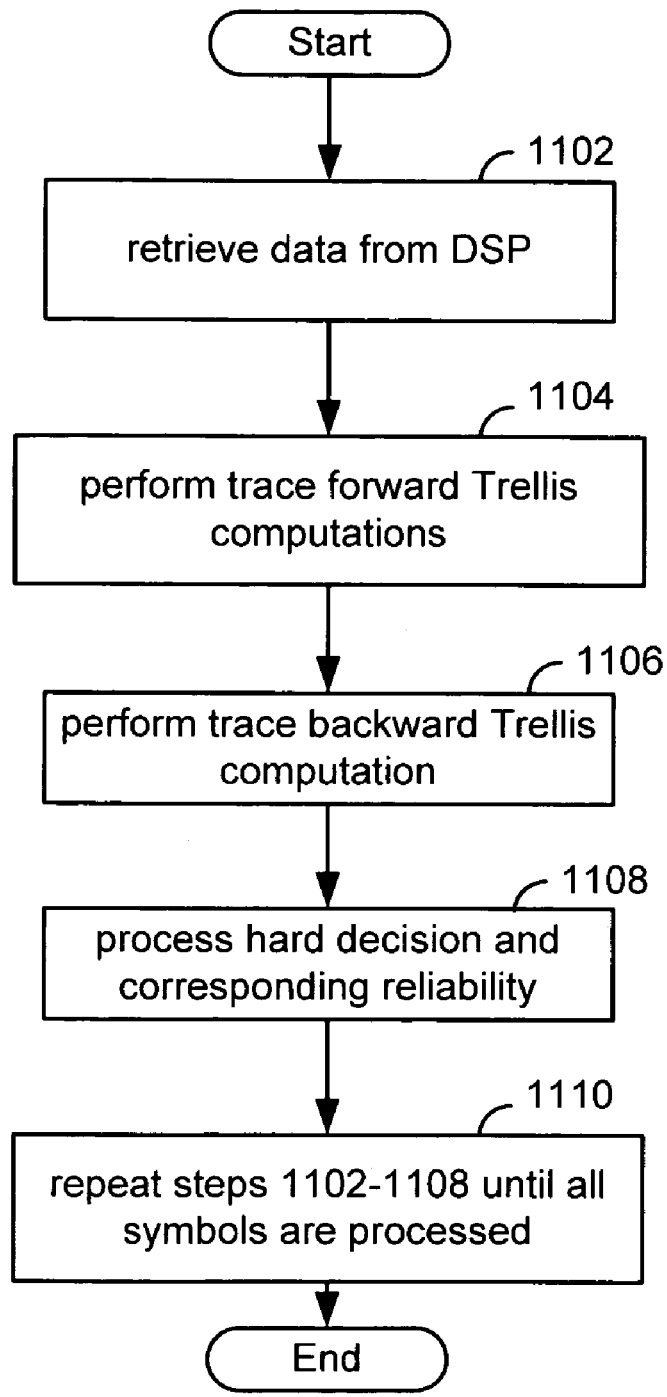
FIG. 11 is a logic flow diagram illustrating the functions performed by the equalizer.

The hardware implementation of an EDGE equalizer performs the following procedures as illustrated in the logic flow diagram of FIG. 11. In step 1102, data is retrieved from DSP. This data may include S-parameters, scaling factors, initial states and mask, initial feedback symbols, and the received data: left side and right side. In step 1104, the EDGE equalizer performs trace forward Trellis computations. These computations include initial accumulated distance metric registers, calculates 8 possible branch distance metrics and 8 possible accumulated distances for each state, compares and select the branch that has the minimum accumulated distance, makes tentative hard decisions based on the current 64 states or using initial feedback symbols to cancel partial ISI and save reconstructed partial ISI, and saving the accumulated distance of the winning path for every state. In step 1106, the EDGE equalizer performs trace backward Trellis computations. These computations include initial accumulated distance metric registers, calculating 8 possible branch distance metrics and 8 possible accumulated distances based on the trace forward metric and the re-constructed partial ISI in each state. In step 1108, after finishing all 64 states, the hard decision and corresponding reliabilities are processed. Step 1110 repeats these processes until all symbols are processed.

In processing of a received EDGE data burst, the equalizer may first receive the 6 complex S-parameters, 2 initial state symbols, 3 initial feedback symbols, 2 ending state symbols, 62 complex received data for both left side and right side, and soft output scaling factor. These parameters are described in the table provided in FIG. 12.

The forward Trellis metric calculations are described with reference to the following equations.

The accumulated metric, $J_k$ 16 unsigned bits, at a given state at time k can be expressed as:

$$J_k = \min_{a_{k-2}} \{J_{k-1} + M_k\} - J_{k-1}^{\min} \quad \text{(eq. 7)}$$

$$J_k = 65535, \text{ if } J_k > 65535. \quad \text{(eq. 8)}$$

$$J_k^{\min} = \min_{\substack{\text{all states} \\ \text{at time } k}} (J_k) \quad \text{(eq. 9)}$$

where $J_{k-1}^{\min}$ is the minimum value among all state accumulated metric at time k–1. n=0, ..., 7, corresponding to index of 8 possible values of $\alpha_{k-2}$, and the branch metric is defined as $$M_k = |D_k|^2 \quad \text{(eq. 10)}$$

$$D_k = \left(r_k - \sum_{i=0}^{2} a_{k-i} s_i - \tilde{r}_k\right) >> 6 \quad \text{(eq. 11)}$$

$$\tilde{r}_k = \sum_{l=3}^{5} \tilde{a}_{k-l} s_l \quad \text{(eq. 12)}$$

$$D_k = \begin{cases} 127 & \text{if } D_k > 127 \\ -127 & \text{if } D_k < -127 \end{cases}. \quad \text{(eq. 13)}$$

where:

$s_i = \{s_i^I, s_i^Q\}$, i=0, 1, ..., 5.
$r_i = \{r_i^I, r_i^Q\}$, i=0, 1, ..., 62, received signals
$\tilde{r}_i = \{\tilde{r}_i^I, \tilde{r}_i^Q\}$, i=0, 1, ..., 62, re-constructed partial ISI.
$\alpha_i = \{\alpha_i^I, \alpha_i^Q\}$, an 8PSK constellation point.
$d_i = 0, 1, \ldots, 7$, hypothesized data sequence associated with a state or trellis branch.
'*' represents the conjugate.
$\tilde{\alpha}_i$ is the tentative hard decision or the initial feedback symbol. $\tilde{\alpha}_{k-3}$ is the symbol corresponding to the state that has the minimum accumulated metric at time k–1 and $\tilde{\alpha}_{k-5}$ is the symbol tracing back one step from the current state.

Note: In Eq. 9, we need round last 6 LSBs of $D_k$ before down-shifting 6 bits.

For a given trellis with L memories (above example L=5), there are the $8^{L-1}$ best paths through branch k–1, denoted by $\check{d}_1 \check{d}_2 \ldots \check{d}_{k-L} d_{k-(L-1)} \ldots d_{k-1}$, where $d_{k-(L-1)} \ldots d_{k-1}$ denotes one of the $8^{L-1}$ state vectors and $\check{d}_1 \check{d}_2 \ldots \check{d}_{k-L}$ are the best path "memories" or tentative decision for that state. Given the corresponding path metrics to the point, $J_{k-1}(d_{k-1}, \ldots, d_{k-(k-1)})$, the best paths to each state through branch k are determined by the following minimization:

$$J_k(d_k, d_{k-1}, \cdots, d_{k-(L-2)}) = \min \quad \text{(Eq. 14)}$$

$$\begin{cases} J_k(d_{k-1}, \cdots, d_{k-(L-2)}, 0) + M_k(r_k : d_k, d_{k-1}, \cdots, d_{k-(L-2)}, 0), \\ \cdots \\ J_{k-1}(d_{k-1}, \cdots, d_{k-(L-2)}, 7) + M_k(r_k : d_k, d_{k-1}, \cdots, d_{k-(L-2)}, 7), \end{cases}$$

$$d_{k-(L-3)} = 0, 1, \cdots, 7$$

Figure 13:
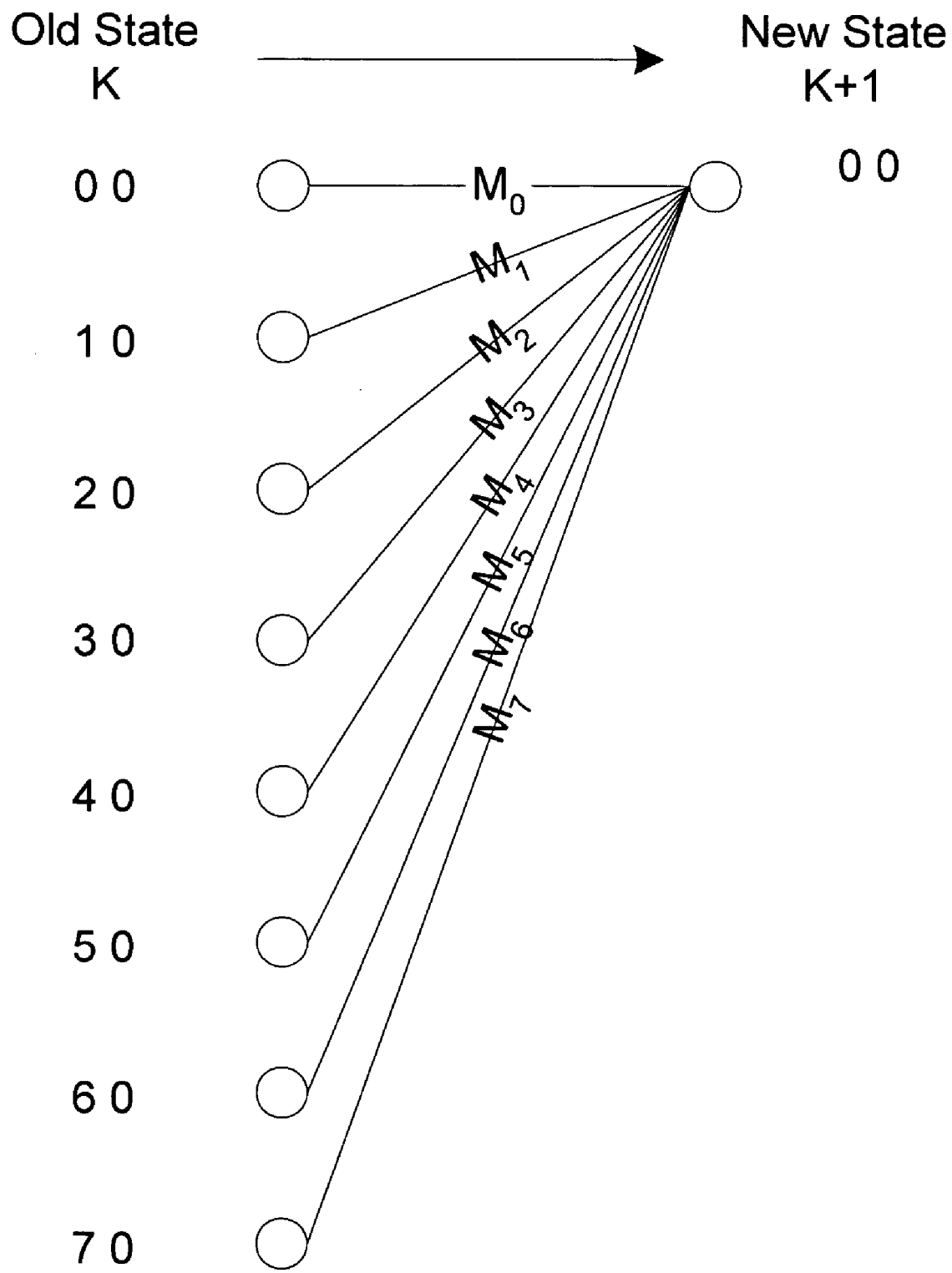
FIG. 13 illustrates an exemplary trace-back memory.

If the $i^{th}$ branch has the minimum value, the resulting path memory symbol is $ă_{k-(L-1)}=i$ for the given state. This value will be stored into the corresponding the tentative trace-back memory. An example is shown in FIG. 13.

After obtaining $J_k$ (16 unsigned bits), it will be downshifted 3 bits, clipped and saved to the trace-back memory for the future use, i.e., $$\hat{J}_k = J_k >> 3$$

$$\hat{J}_k = 4095, \text{ if } \hat{J}_k > 4095 \text{ (unsigned 12 bits).} \quad \text{(Eq. 15)}$$

The size of the trace back memory is 58×64×12. It is shared with the GSM equalizer trace back memory. The initial values of the $J_k$:

$J_k=0$ at the state specified in the initial state register LHINIT/RHINIT.

Else $J_k=16383$.

Note: $K=(d_{k+1}, d_k)=d_{k+1}*8+d_k$.

A 64×16-bit tentative trace-back memory depicted in the tables provided in able 1 may be used to store the hard-decision for each state. When k<3, only hard-decision $ă_k^i$, i=0, ..., 63, are saved into trace-back memory and there does not need to do trace back because the first three tail symbols or five training symbols are known. They can be used to calculate the partial ISI. When k=3, we have to trace back one symbol to get $(7, 7, ă_{k-2})$ to calculate the partial ISI. When k=4, we have to trace back two symbols to get $(7, ă_{k-3}, ă_{k-2})$. After k>4, we have to trace back three symbols to get $(ă_{k-4}, ă_{k-3}, ă_{k-2})$.

Tentative decision is made based on the following steps:
a) Select state I that has minimum accumulated distance among all 64 states at time k;
b) Find the current hard-decision $ă_k^I$ at state I;
c) Trace back two or four steps based on $I=(I*8)\%64+ă_k^I$ to get final tentative hard-decisions.

TABLE 4

| | \multicolumn{6}{c}{Tentative trace-back memory} | | | | | |
|---|---|---|---|---|---|---|
| | 15 | 14-12 | 11-9 | 8-6 | 5-3 | 2-0 |
| state 0 | x | $ă_{k-4}^0$ | $ă_{k-3}^0$ | $ă_{k-2}^0$ | $ă_{k-1}^0$ | $ă_k^0$ |
| state 1 | x | $ă_{k-4}^1$ | $ă_{k-3}^1$ | $ă_{k-2}^1$ | $ă_{k-1}^1$ | $ă_k^1$ |
| state 2 | x | $ă_{k-4}^2$ | $ă_{k-3}^2$ | $ă_{k-2}^2$ | $ă_{k-1}^2$ | $ă_k^2$ |
| . | | | | | | |
| . | | | | | | |
| . | | | | | | |
| state 63 | x | $ă_{k-4}^{63}$ | $ă_{k-3}^{63}$ | $ă_{k-2}^{63}$ | $ă_{k-1}^{63}$ | $ă_k^{63}$ |

The tentative hard-decision register can be shared with the initial feedback register LHFB/RHFB. The register should store 8PSK modulated symbols $\tilde{\alpha}_{k-i}=(\tilde{\alpha}_{k-i}^I, \tilde{\alpha}_{k-i}^Q)$, i=0, 1, 2, 3, 4 (see Table 2), $\tilde{\alpha}_{k-4}, \tilde{\alpha}_{k-3}, \tilde{\alpha}_{k-2}$ are used to calculate partial ISI. $\tilde{\alpha}_{k-1}$ and $\tilde{\alpha}_k$ are used as the initial values for the processing of the second and third symbols of the EQ.

TABLE 5

| | \multicolumn{5}{c}{Tentative hard-decision register} | | | | |
|---|---|---|---|---|---|
| I | $\tilde{a}_{k-4}^I$ | $\tilde{a}_{k-3}^I$ | $\tilde{a}_{k-2}^I$ | $\tilde{a}_{k-1}^I$ | $\tilde{a}_k^I$ |
| Q | $\tilde{a}_{k-4}^Q$ | $\tilde{a}_{k-3}^Q$ | $\tilde{a}_{k-2}^Q$ | $\tilde{a}_{k-1}^Q$ | $\tilde{a}_k^Q$ |

There is a 58×15-bit memory to store partial re-constructed ISI. This will be used in the calculate branch metric of the backward trellis equalization. In the forward trellis metric calculation, the calculated partial ISIs, $\tilde{r}_k$, k=1, 2, ..., 58, are stored in this memory. If the receive memory is 59×17-bit, $r_k-\tilde{r}_k$ can be saved in the receive memory. Therefore, 58×15-bit memory is no longer needed.

Figure 14:
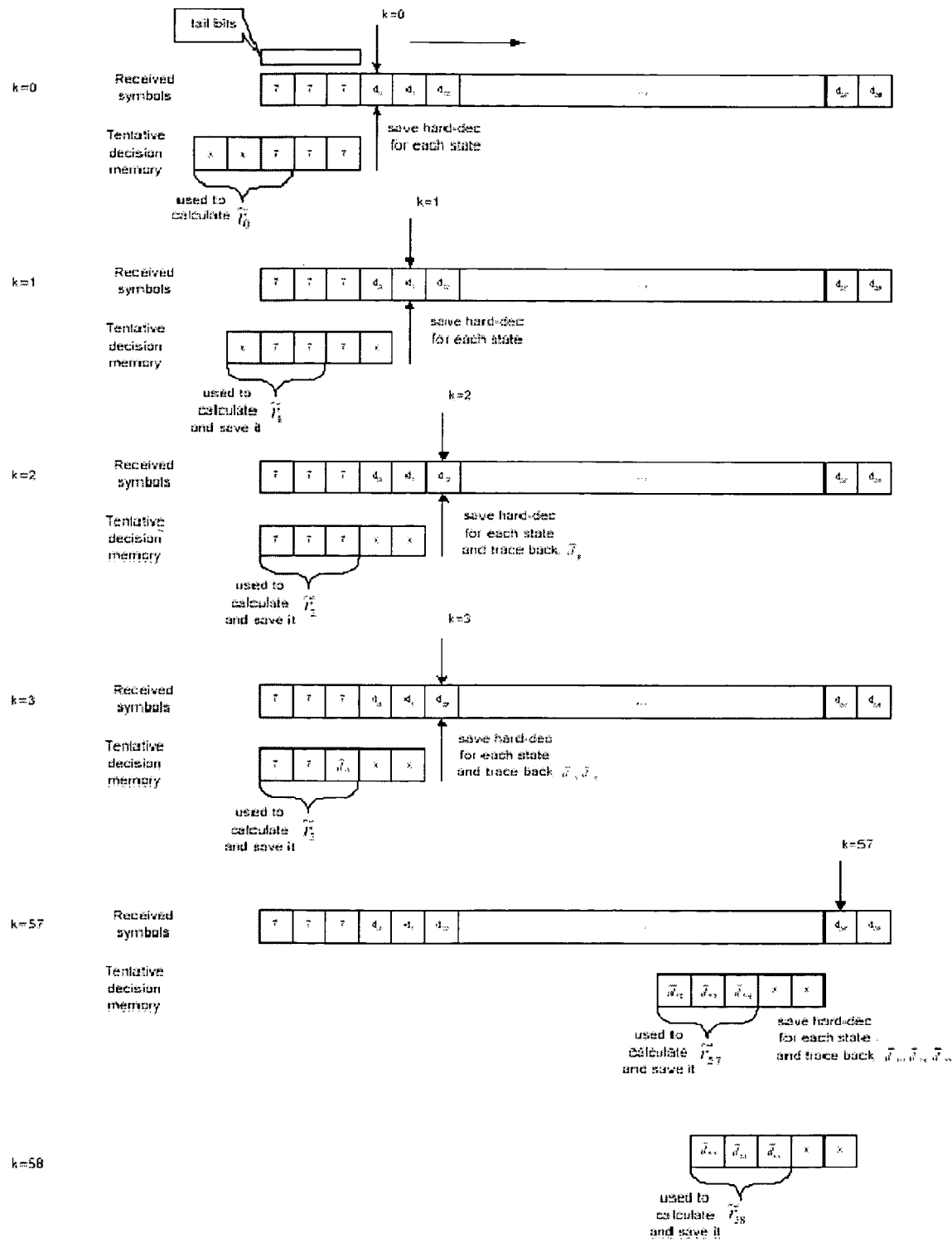
FIG. 14 depicts the forward EQ and tentative decision memory (Left side)
Figure 15:
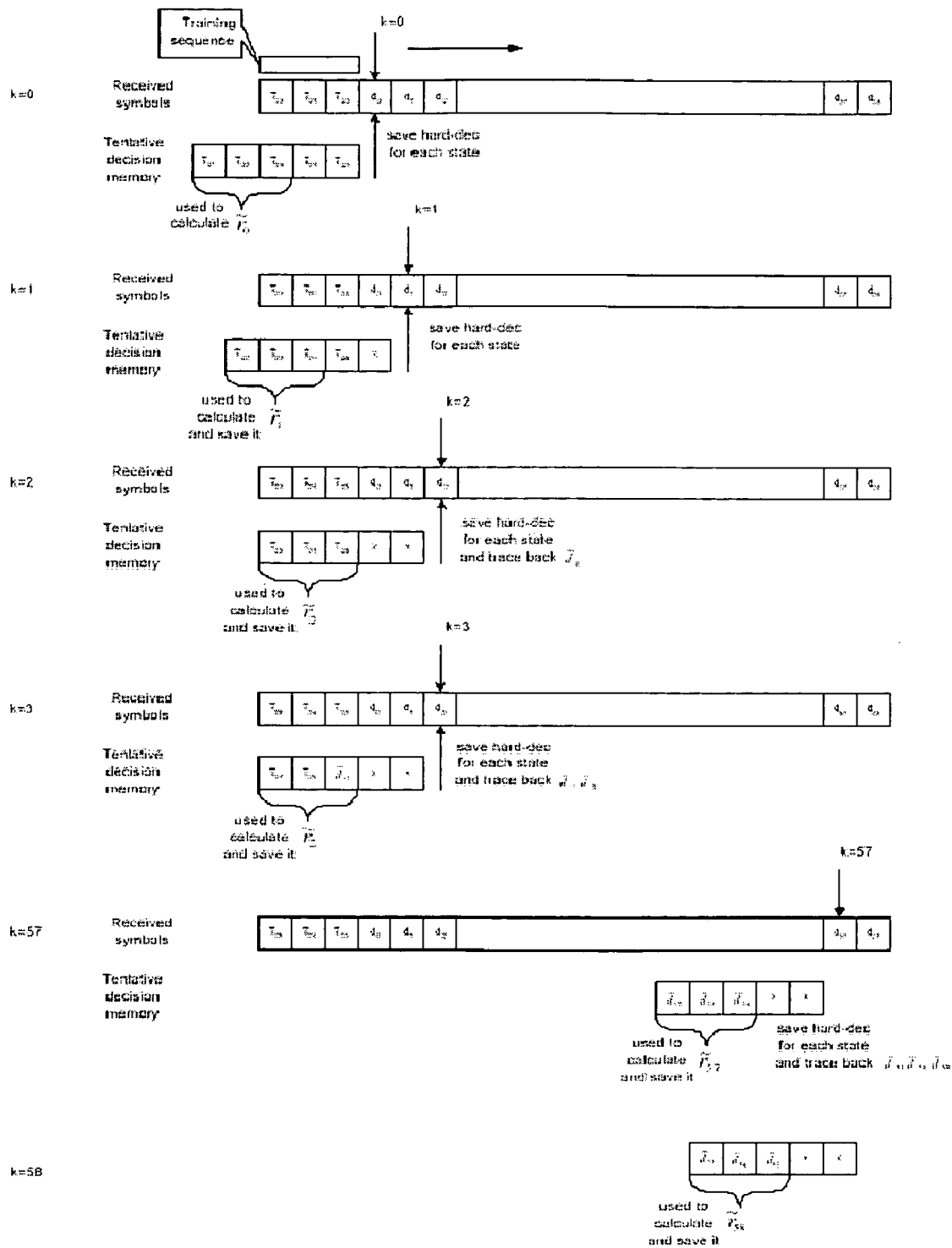
FIG. 15 depicts the forward EQ and tentative decision memory (Right side)

The timing relationship between received signals and tentative decision memory is illustrated in FIGS. 14 and 15. The forward EQ starts from time k=0. FIG. 14 depicts the forward EQ and tentative decision memory (Left side). Similarly, FIG. 15 depicts the forward EQ and tentative decision memory (Right side).

Figure 16:
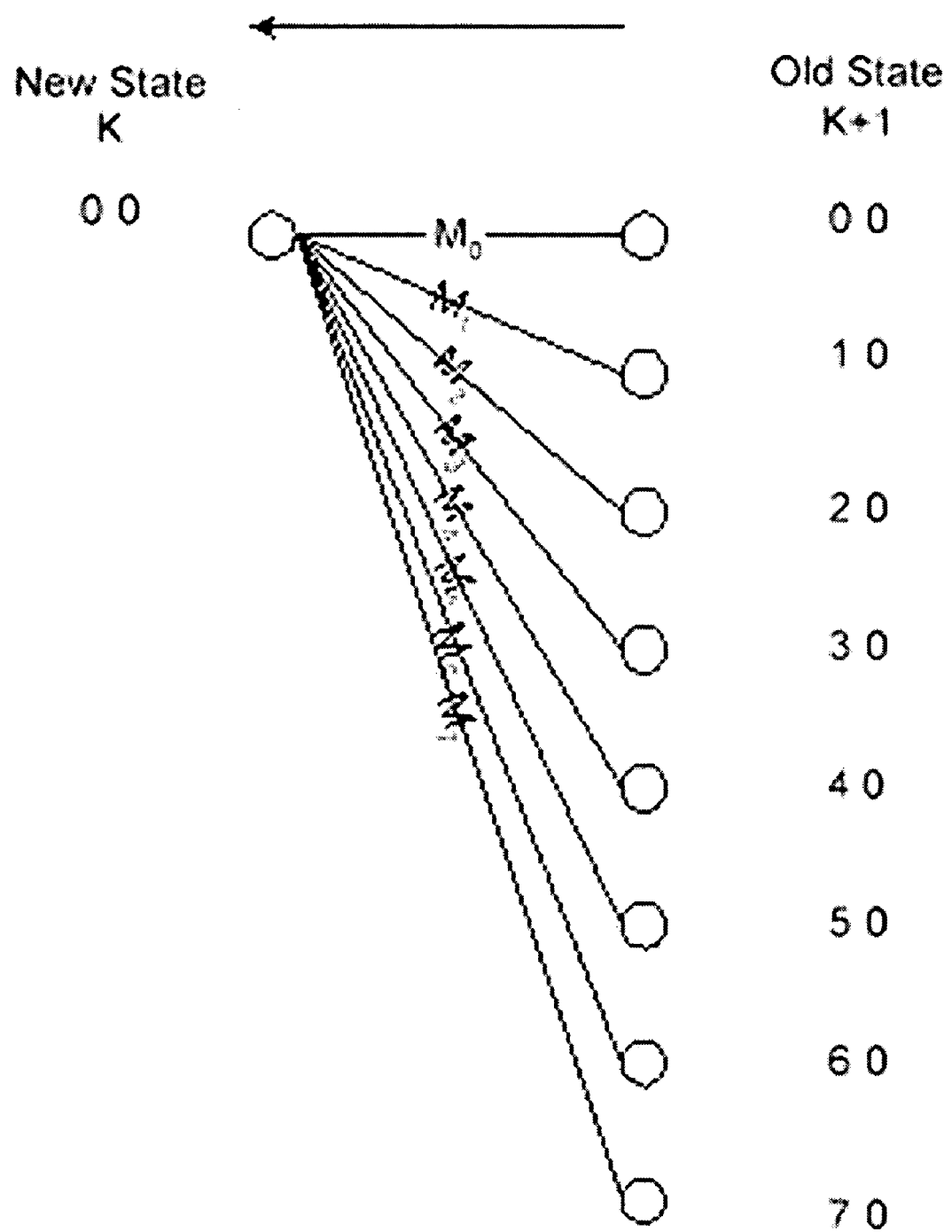
FIG. 16 provides an example of a backward trellis block diagram.

The backward equalization is the same as the forward equalization. The backwards equalization starts from time k=58. The initial value of the accumulated distance $J_k$ is 0 for all states. The accumulated metric for a given state at time k can be calculated by Eq. 7, in which the partial ISI $\tilde{r}_k$ was already obtained in the forward equalization processing and stored in the re-constructed partial ISI memory. An example of the backward trellis block diagram is given in FIG. 16.

Figure 17:
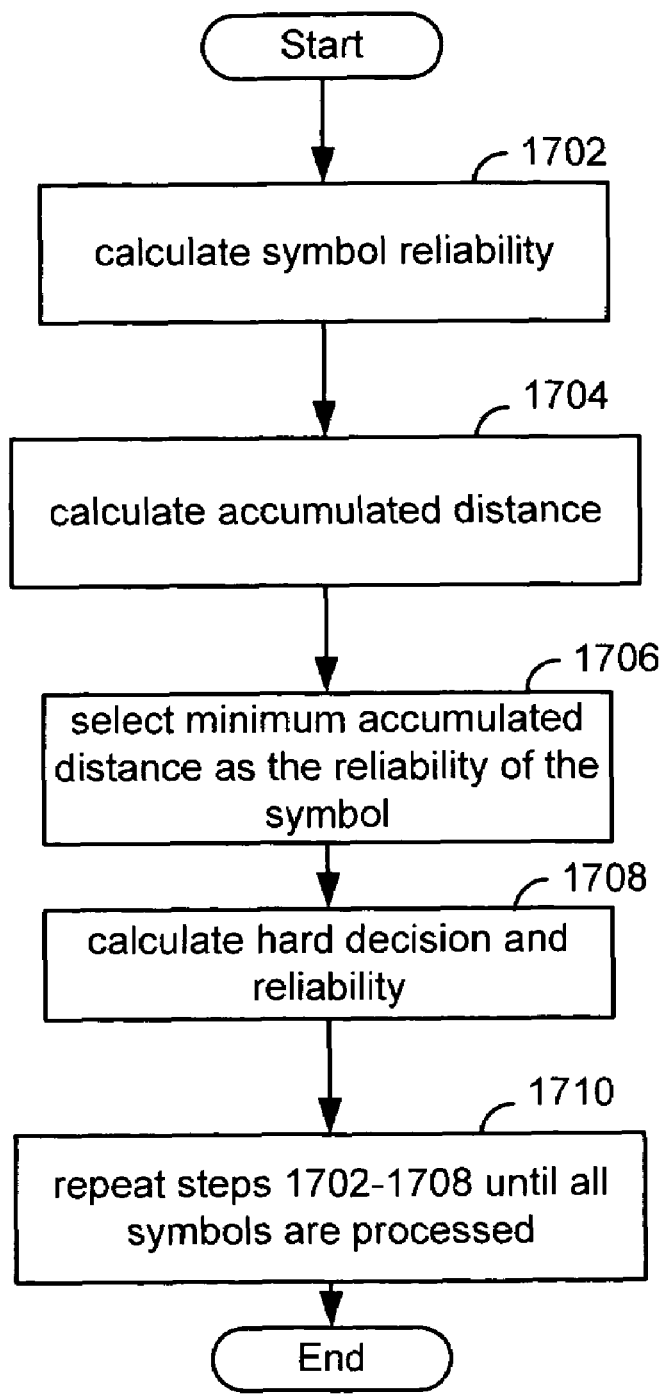
FIG. 17 is a logic flow diagram that describes how final hard decision and corresponding reliability or soft-decision may be processed.

After obtaining all 64 accumulated distances at time k, final hard decision and corresponding reliability or soft-decision may be processed according to the following procedures as illustrated in the process flow diagram of FIG. 17. In step 1702, the symbol reliability is calculated. For a given symbol d, (d=0, 1, ..., 7), there are 8 states: $x_i=d*8+i$, i=0, 1, ..., 7. The 8 accumulated distance may be calculated in step 1704 based on the Eq. 16:

$$J_k(x_i) = \hat{J}_{k-1}^F(x_i) + \hat{J}_k^B(x_i)$$

where $\hat{J}_k^F$ is the scaled accumulated distance of the forward equalization stored in the trace back memory.

$\hat{J}_k^B = J_k^B >> 3$: the scaled accumulated distance of the backward equalization.

$\hat{J}_k^B = 4095$, if $\hat{J}_k^B > 4095$ (unsigned 12 bits).

Step 1706 selects the one that has the minimum accumulated distance as the reliability as the symbol d, denoted as P(d). Then step 1708 calculates hard decision bit and its reliability. An 8PSK symbol d can be represented by three-bit ($b_0$, $b_1$, $b_2$). The hard decision bit and its corresponding reliability S_i may be calculated as follows:

Bit 0:

$$S\_0 = |\min(P(0), P(1), P(2), P(3)) - \min(P(4), P(5), P(6), P(7))| \quad (3\text{-}6a)$$

If min(P(0), P(1), P(2), P(3))<min(P(4), P(5), P(6), P(7)), then $b_0=0$;

Else $b_0=1$.

Bit 1:

$$S\_1 = |\min(P(0), P(1), P(4), P(5)) - \min(P(2), P(3), P(6), P(7))| \quad (3\text{-}6b)$$

If min(P(0), P(1), P(4), P(5))<min(P(2), P(3), P(6), P(7)), then $b_1=0$;

Else $b_1=1$

Bit 2:

$$S\_2 = |\min(P(0), P(2), P(4), P(6)) - \min(P(1), P(3), P(5), P(7))| \quad (3\text{-}6c)$$

If min(P(0), P(2), P(4), P(6))<min(P(1), P(3), P(5), P(7))| then $b_2=0$;

Else $b_2=1$

The soft scaling factor δ shall be read from register. Assume x represents un-scaled soft-decision. The scaling procedure is as follows:

If $\delta = 1$, $x = x + (x \gg 1)$; (Eq. 17)

$$x = \begin{cases} x \gg NSF & \text{if } NSF > 0 \\ x \ll NSF & \text{if } NSF < 0 \end{cases}$$ (Eq. 18)

$x = 7$, if $x > 7$. (Eq. 19)

Figure 18:
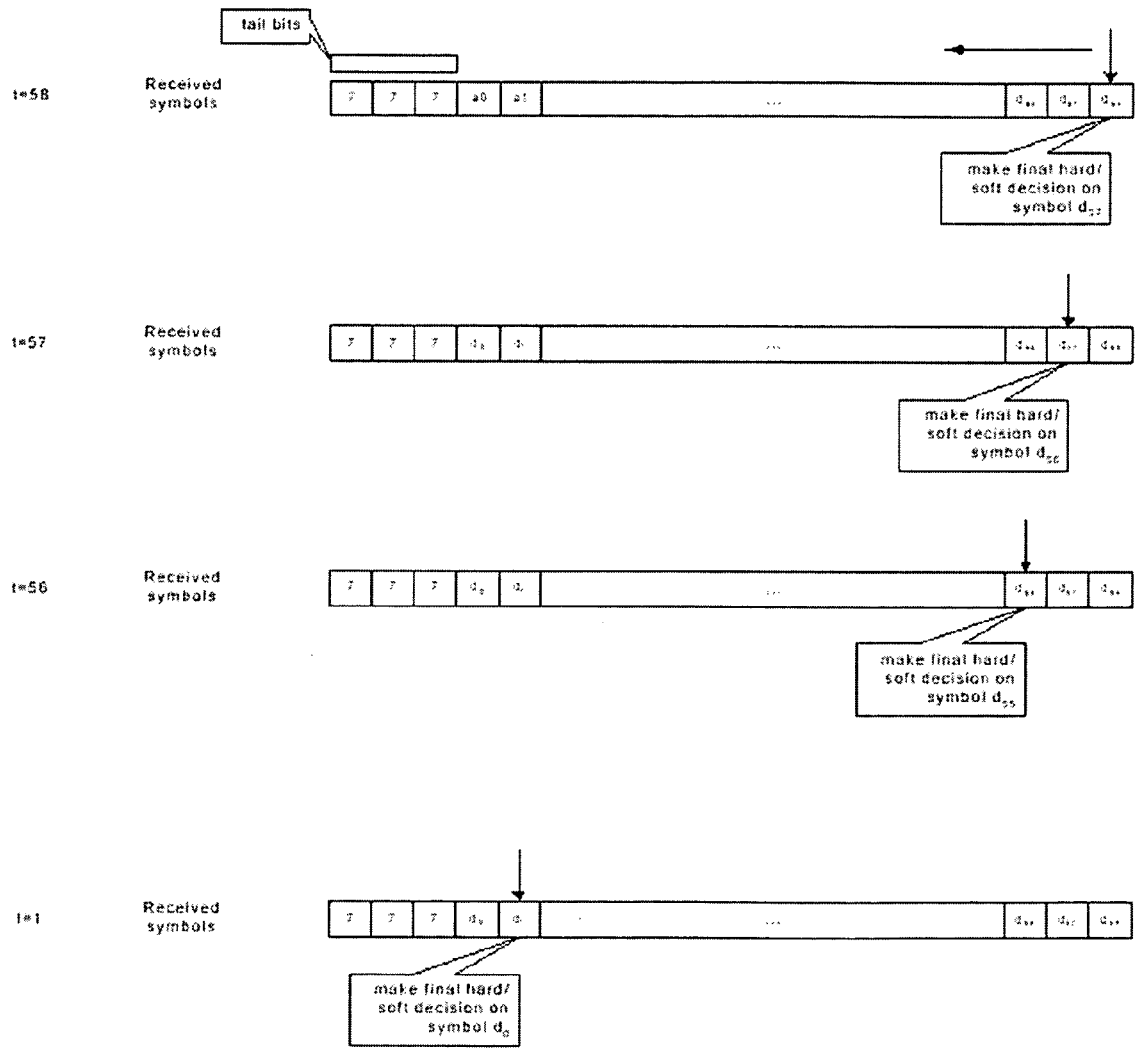
FIG. 18 illustrates the repetitive process associated with converting soft and hard decisions to a predetermined format.

After scaling, the soft decision and hard decision ($b_i$, S_i), i=0, 1, 2, shall be converted to the input format (Ŝ_i) of the convolutional decoder in accordance with a conversion table. The table may indicate the actual metric values used internally by the convolutional decoder and the conversion table illustrates that no erasures (zero convolutional decoder metric) are generated in the convolutional decoder by the equalizer soft decisions. By completing transform, pack those three soft decisions (Ŝ_2, Ŝ_1, Ŝ_0) together to form a 12-bit soft decision for an 8PSK symbol and save it in the output memory. This process is repeated until all received symbols are processed as illustrated in FIG. 18.

The calculation of the branch metric, may require the calculation of an 8PSK symbol or a constellation point. This may involve mapping between modulating bits and the 8PSK symbol parameter $d_i$.

Returning to FIG. 8, the equalizing processing module 900 supports the MLSE/MAP processes. One embodiment supports five equalizer algorithms: 64 state EDGE 8PSK MAP, 16 state GMSK TCH MLSE, 16 state GMSK SCH MLSE, 32 state GMSK TCH MLSE, and 32 state GMSK TCH MLSE. These algorithm types are coded into three mode bits (bits [2:0]) in the EQ_CFG Register. The input and output metrics and parameters associated with each of the five equalizer algorithm types are described below. The 64 State EDGE 8PSK MAP inputs require:

a) 62 complex LH input received data symbols;
b) 62 complex RH input received data symbols;
c) 5 LH initial feed back symbols;
d) 2 zero feed back symbol zero indicators;
e) 5 RH initial feed back symbols;
f) 6 complex S-parameters; and
g) 1 Soft output metric scaling factor.

The outputs require 348 scaled soft metrics. These inputs and outputs can share the same memory physically or utilize dedicated memories.

The 16 State GMSK TCH (SCH) MLSE inputs require:

a) 62 (43) real LH input received data symbols;
b) 62 (43) real RH input received data symbols;
c) 1 each of LH initial state, LH initial mask, LH final state and LH final mask;
d) 1 each of RH initial state, RH initial mask, RH final state and RH final mask
e) 16 precomputed branch metrics, "$M_k$'s"; and
f) 1 Soft output metric scaling factor, while the outputs require 116 (78) scaled soft metrics.

The 32 State GMSK TCH (SCH) MLSE require:

a) 63 (44) real LH input received data symbols;
b) 63 (44) real RH input received data symbols;
c) 1 each of LH initial state, LH initial mask, LH final state and LH final mask;
d) 1 each of RH initial state, RH initial mask, RH final state and RH final mask
e) 32 precomputed branch metrics, "$M_k$'s"; and
f) 1 Soft output metric scaling factor, while the outputs require 116 (78) scaled soft metrics.

The equalizer is the final processing block of the data demodulation procedure. The RIP performs the following steps to demodulate the received data. First, I and Q values are read from the sample-capture buffer. The complex samples are then rotated by a frequency correction rotator. A correlation with training sequence of nine positions is performed to compute channel estimation metrics from the correlation values. A synchronization offset is determined from training sequence correlation function to compute energy metrics from training sequence correlation function. An auto-correlate of the channel estimation metrics to compute state-dependent incremental metrics for Viterbi trellis for the GSM is performed next. A match filter function on the 156 complex samples with channel estimation metrics for the GSM follows. 12 state-dependent incremental metrics (S-Parameters) are loaded into EQ trellis buffer for EDGE. Or, 16 (for 16 state GMSK EQ; 32 for 32 state GMSK EQ) pre-calculated branch metrics into the EDGE receive buffer (imaginary part) are loaded for GMSK. 5/4-bit or 2-symbol INIT/MASK and 5/4-bit are loaded as the FINAL/MASK equalizer trellis parameters. 3 initial feedback symbols and a noise-scaling factor are loaded for both the LH and RH sides. Left Hand side, LH, is loaded with 5/4+58 normal burst metric samples or 5+39 SCH burst samples. Right Hand side, RH, is loaded with 5/4+58 normal burst metric samples or 5+39 SCH burst samples. The equalizer processing module is then started by writing to the sample or input buffer 908 of the equalizer interface of FIG. 8. ALUs 928 are configured by writing to the configuration registers 923 of FIG. 10. When processing is complete, the soft decision metrics are read from the from equalizer output buffer 910. The table provided in FIG. 19 provides an example of an EDGE/GSM Equalizer Register Summary and Memory Map.

Various registers are used within the equalizing processing module. The input and output sample buffers of FIG. 8 allow the baseband signal and soft decisions to be received and provided to the system processor. However, within the equalizer co-processor itself, registers are used by the equalizer to configure the accelerator module, direct what called functions are to be performed; wherein these called functions may be performed by specific ALUs, and the input and output memory location that the called functions received their input from and output to. The equalizer configuration register, receives an input from the equalizer co-processor as to which specific functions are to be called and the memory locations to be used by these functions. DSP 304 may read or write data directly to memory locations accessible to the equalizer accelerator depending on how the equalizer processing module 318 is to be structured.

When processing a received GSM data burst, similar processes are used. However the exact configuration and algorithms may differ. For example with a received GSM data burst the equalizer first should get 5 initial state bits, 5 ending state bits, 63 received data (real values) for both left side and right side, and soft output scaling factors. These parameters are described in the table provided in FIG. 20.

To perform the Trace forward to compute the Trellis metric one must use the following equations.

Definition:

Current state: $x_k = (\alpha_k, \alpha_{k-1}, \alpha_{k-2}, \alpha_{k-3}, \alpha_{k-4})$ Previous state: $x_{k-1} = (\alpha_{k-1}, \alpha_{k-2}, \alpha_{k-3}, \alpha_{k-4}, \alpha_{k-5})$ Transition: $\xi_k = (\alpha_k, \alpha_{k-1}, \alpha_{k-2}, \alpha_{k-3}, \alpha_{k-4}, \alpha_{k-5})$ where:

$\xi_k$ can be represented as $\xi_k = (\alpha_k+1)2^4 + (\alpha_{k-1}+1)2^3 + (\alpha_{k-2}+1)2^2 + (\alpha_{k-3}+1)2 + \alpha_{k-4}+1+(\alpha_{k-5}+1)/2$. $\alpha_k$ is a binary value $\{-1, 1\}$.

For the Viterbi algorithm, the accumulated metric, $J_k$ signed 16-bit, at a given state at time k can be expressed as $$J_k(x_k) = \min \qquad \text{(eq. 20)}$$
$$\begin{cases} J_{k-1}(a_{k-1}, \cdots, a_{k-4}, -1) + M_k(z_k : a_k, a_{k-1}, \cdots, a_{k-4}, -1), \\ J_{k-1}(a_{k-1}, \cdots, a_{k-4}, 1) + M_k(z_k : a_k, a_{k-1}, \cdots, a_{k-4}, 1), \end{cases}$$
$$a_k = -1, 1$$

$$J_k(x_k) = J_k(x_k) - a_k z_k - J_{k-1}^{\min}(x_{k-1}), \qquad \text{(eq. 21)}$$

$$J_k(x_k) = \begin{cases} 32767 & \text{if } J_k(x_k) > 32767 \\ -32767 & \text{if } J_k(x_k) < -32767 \end{cases}, \qquad \text{(eq. 22)}$$

where the branch metric is defined as $$M_k = a_k \sum_{l=1}^{5} a_{k-l} s_l, \qquad \text{(eq. 23)}$$

and $J_{k-1}^{min}(x_{k-1})$ is the minimum value among all 32 states at time k−1. $s_l$ is the $l^{th}$ S-parameter.

If the $i^{th}$ branch has the minimum value, the resulting path memory symbol is $\alpha_{k-5}=i$ with the corresponding soft-decision for the given state. Because the EDGE equalizer and the GSM equalizer share the registers in the BCM2132+, 32 values of $M_k$ (k=0, 1, . . . , 31) can be pre-calculated and stored into the receive buffer of the image part used in the EDGE mode. The other 32 ($M_k$, k=31, . . . , 63) are just negative values of the $M_k$ (k=0, 1, . . . , 31) correspondingly. The hardware only reads data from the register based on the states. In the first 5 iterations, we do not need to save the output because they are just initial bits. After that, 58×32 output symbols are saved in the traceback memory. Note: The input and output can share the same memory physically.

The soft decision computation is computed on the bit basis. Besides the hard-decision, its reliability or the corresponding metric difference should be calculated as follows:

$$\text{Soft} = |J_k^0 - J_k^1| \qquad \text{(eq. 24)}$$

where $J_k^i = J_{k-1}(\alpha_{k-1}, \ldots, \alpha_{k-4}, i) + M_k(z_k: \alpha_{k-1}, \ldots, \alpha_{k-4}, i)$. (eq. 25)

The soft scaling factors (NSF, $\delta$) shall be read from the DSP register. Assume x represents un-scaled soft-decision or corresponding bit reliability. The scaling procedure is as follows:

If $\delta=1$, $x=x+(x>>1)$; (eq. 26)

$x=x>>\text{NSF}$ (eq. 27)

$x=7$, if $x>7$. (eq. 28)

After scaling, the hard-decision (b) and its reliability (x) should be combined into (b, x) and be converted to the input format ($\hat{S}$) of the convolutional decoder in accordance with a conversion table. The table indicates the actual metric values used internally by the convolutional decoder and the conversion table illustrates that no erasures (zero convolutional decoder metric) are generated in the convolutional decoder by the equalizer soft decisions. By completing transform, $\hat{S}$ should be saved in the trace forward memory.

Backward trace through the path history gives the maximum likelihood path sequence through the trellis. Following forward trace, the beginning node for backward tracing shall be determined by the procedure described above. During backward tracing along the winning path through the path history, the hard-decision and 3-bit metric difference stored at each node along the winning comprise the soft decision output in 4-bit sign-magnitude format. The output of the traceback operation should be 58 soft-decisions for both left-side and right-side.

The initial conditions for trellis path metrics shall be set by the initial state vector and initial state mask, each a five-binary word. The initial state vector shall indicate the initial 5 bits preceding the first user data bits and the initial state mask shall indicate which of the two bits are "don't care". The initial state and initial state mask jointly indicate which of the 32 possible initial states are valid candidates for initial state. To eliminate the possibility of the invalid initial states remaining in a survivor path, the initial state metrics J for invalid states shall be initialized to the very large value, 32767, and the valid states initialized to zero.

Similarly, the trellis termination is specified by the final state and final state mask which jointly designate the valid terminal states, and the traceback begins from the valid terminal state having the minimum state metric value J at the final level of the trellis.

In summary, the present invention provides an equalizer processing module within a wireless terminal having an equalizer interface that receives an incoming baseband signal from a baseband processor operably coupled to the equalizer processing module and outputs soft decisions. A processor or advanced reduced instruction set computer (RISC) machine (ARM) couples to the equalizer interface while an equalizer accelerator module operably couples to the processor or ARM. Processing of the incoming baseband signal to produce soft decisions is performed by the combination of the processor and equalizer accelerator module. A sample capture buffer and an equalizer output buffer which may or may not be within the equalizer processing module allow data to be sampled and serves as the input and output for the equalizer processing module. This equalizer accelerator may specifically perform compute intensive operations such as Trellis computations for MAP equalization or MLSE equalization.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship.

For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An equalizer operable to support equalization processing within a wireless terminal, comprising:
    a baseband processor to receive an incoming signal and to perform pre-equalization processing that includes timing, channel, noise and signal-to-noise estimations;
    an equalizer interface coupled to receive input content and configuration information from the baseband processor, wherein the equalizer interface includes a configuration register, an input buffer, and an output buffer;
    a dedicated processor coupled to the equalizer interface and configured to run a process specified by mode bits loaded in the configuration register, wherein the dedicated processor is operable to perform compute intensive operations related to equalization on pre-equalized data associated with the input content of the input buffer and provides output content associated with resulting data to the output buffer for coupling to the baseband processor to perform post-equalization processing; and
    wherein processing of a baseband signal to produce soft decisions is performed by the baseband processor and the dedicated processor, in which the dedicated processor is operable to support equalization processing of 64 state EDGE 8PSK MAP, 16 state GMSK TCH MLSE, 16 state GMSK SCH MLSE, 32 state GMSK TCH MLSE, and 32 state GMSK TCH MLSE by performing MLSE operations on left side data of a GMSK burst to obtain MLSE left side decision and performing MLSE operations on right side data of the GMSK burst to obtain MLSE right side decision, separate from the left side decision, in the dedicated processor for GMSK equalization, and by preparing state values and performing MAP operations to produce left and right side decisions in the dedicated processor for EDGE 8PSK equalization, and wherein the mode bits set in the configuration register by the baseband processor selects which of the supported equalization processing is to be performed by the dedicated processor; and further wherein the timing estimation includes determining the average phase of the left and right sides of the processed baseband signal based on the soft-decisions.

2. The equalizer of claim 1, wherein the input buffer is a sample capture buffer.

3. The equalizer of claim 1 is operable to support equalization processing within a wireless terminal that performs Trellis computations for MAP equalization.

4. The equalizer of claim 1 is operable to support equalization processing within a wireless terminal that performs Trellis computations for MLSE equalization.

5. A wireless terminal that comprises:
    a Radio Frequency (RF) front end;
    a baseband processor coupled to receive an incoming signal from the RF front end and to perform pre-equalization processing that includes timing, channel, noise and signal-to-noise estimations; and
    an equalizer accelerator module operably coupled to the baseband processor, wherein the equalizer accelerator module further includes:
        an equalizer interface coupled to receive input content and configuration information from the baseband processor, wherein the equalizer interface includes a configuration register, an input buffer and an output buffer;
        a dedicated processor operably coupled to the equalizer interface and configured to run a process specified by mode bits loaded in the configuration register, wherein the dedicated processor is operable to perform compute intensive operations related to equalization on pre-equalized data associated with the input content of the input buffer and provides output content associated with resulting data to the output buffer for coupling to the baseband processor to perform post-equalization processing; and
        wherein processing of a baseband signal to produce soft decisions is performed by the baseband processor and the dedicated processor, in which the dedicated processor is operable to support 64 state EDGE 8PSK MAP, 16 state GMSK TCH MLSE, 16 state GMSK SCH MLSE, 32 state GMSK TCH MLSE, and 32 state GMSK TCH MLSE by performing MLSE operations on left side data of a GMSK burst to obtain MLSE left side decision and performing MLSE operations on right side data of the GMSK burst to obtain MLSE right side decision, separate from the left side decision, in the dedicated processor for GMSK equalization, and by preparing state values and performing MAP operations to produce left and right side decisions in the dedicated processor for EDGE 8PSK equalization, and wherein the mode bits set in the configuration register by the baseband processor selects which of the supported equalization processing is to be performed by the dedicated processor; and further wherein the timing estimation includes determining the average phase of the left and right sides of the processed baseband signal based on the soft-decisions.

6. The wireless terminal of claim 5, wherein the input buffer is a sample capture buffer.

7. The wireless terminal of claim 5, wherein the equalizer accelerator module performs Trellis computations for MAP equalization.

8. The wireless terminal of claim 5, wherein the equalizer accelerator module performs Trellis computations for MLSE equalization.

9. A method to perform equalization within a wireless terminal comprising:
    receiving an incoming signal and performing pre-equalization processing that includes timing, channel, noise and signal-to-noise estimations at a baseband processor;
    receiving input content and configuration information at an equalizer accelerator module from the baseband processor, wherein the configuration information is loaded into a configuration register, in which the configuration information includes mode bits;

determining a mode of operation of the equalizer accelerator module from the mode bits within the configuration register;

performing compute intensive operations related to equalization on pre-equalized data in the equalizer accelerator module and generating resulting data for coupling to the baseband processor to perform post-equalization processing; and wherein processing of the baseband signal to produce soft decisions is performed in the baseband processor and the equalizer accelerator module, in which the equalizer accelerator module is operable to support 64 state EDGE 8PSK MAP, 16 state GMSK TCH MLSE, 16 state GMSK SCH MLSE, 32 state GMSK TCH MLSE, and 32 state GMSK TCH MLSE by performing MLSE operations on left side data of a GMSK burst to obtain MLSE left side decision and performing MLSE operations on right side data of the GMSK burst to obtain MLSE right side decision, separate from the left side decision, in the equalizer accelerator module for GMSK equalization, and by preparing state values and performing MAP operations to produce left and right side decisions in the equalizer accelerator module for EDGE 8PSK equalization, and wherein the mode bits set in the configuration register by the baseband processor selects which of the supported equalization processing is to be performed by the equalizer accelerator module; and further wherein the timing estimation includes determining the average phase of the left and right sides of the processed baseband signal based on the soft-decisions.

10. The method of claim 9, wherein the equalizer accelerator module further includes an equalizer interface that provides input and output buffering with the baseband processor.

11. The method of claim 10, wherein the equalizer interface includes a sample capture buffer and an equalizer output buffer.

12. The method of claim 10, wherein the equalizer accelerator module performs Trellis computations for MAP equalization.

13. The method of claim 10, wherein the equalizer accelerator module performs Trellis computations for MLSE equalization.

* * * * *